(12) United States Patent
Shiizaki et al.

(10) Patent No.: US 7,613,977 B2
(45) Date of Patent: Nov. 3, 2009

(54) RETRANSMISSION CONTROL METHOD AND TRANSMITTER IN WIRELESS COMMUNICATION SYSTEM

(75) Inventors: Kotaro Shiizaki, Kawasaki (JP); Daisuke Jitsukawa, Kawasaki (JP); Kenji Suda, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 11/377,497

(22) Filed: Mar. 16, 2006

(65) Prior Publication Data

US 2007/0124639 A1    May 31, 2007

(30) Foreign Application Priority Data

Nov. 29, 2005    (JP)    ............................. 2005-343409

(51) Int. Cl.
*G08C 25/00*    (2006.01)
*H04L 1/18*    (2006.01)

(52) U.S. Cl. ...................................... 714/748
(58) Field of Classification Search ......... 714/748–750, 714/18
See application file for complete search history.

(56) References Cited

U.S. PATENT DOCUMENTS

| | | | |
|---|---|---|---|
| 4,755,993 A | | 7/1988 | Grover |
| 5,414,717 A | * | 5/1995 | Matsumoto et al. ......... 714/748 |
| 6,141,784 A | | 10/2000 | Davis et al. |
| 7,003,710 B2 | | 2/2006 | Tomaru et al. |
| 7,058,071 B1 | * | 6/2006 | Myles et al. ................. 370/419 |

FOREIGN PATENT DOCUMENTS

| | | |
|---|---|---|
| JP | 3-262225 | 11/1991 |
| JP | 2005-039726 | 2/2005 |

OTHER PUBLICATIONS

David Chase. Code Combining- A Maximum-Likelihood Decoding Approach for Combining an Arbitrary Number of Noisy Packets. IEEE Transactions on Communications, vol. Comm-33, No. 5, May 1985, pp. 385-393.
European Search Report dated Jun. 27, 2006.
Youngsup Kim, et al. "An Adaptive Hybrid ARQ Scheme Using Shortened Codes" Global Telecommunications Conference, Nov. 1996, vol. 3, pp. 2157-2161, XP010220256.
Andreas Willig. "Intermediate Checksums for Improving Goodput over Error-Prone Links" Vehicular Technology Conference, Sep. 2004, pp. 2123-2128, XP010787014.

* cited by examiner

*Primary Examiner*—Shelly A Chase
(74) *Attorney, Agent, or Firm*—Katten Muchin Rosenman LLP

(57) ABSTRACT

In a wireless communication system, in which a frame comprising data and control information necessary for reception processing of the data is transmitted from a transmitter, and in which, when a reception failure is notified by a receiver, the frame that failed to be received is retransmitted, the control information is classified into first control information that can be different for a new frame transmission and a repeat frame transmission and second control information that is the same for the new frame transmission and the repeat frame transmission, information indicating whether or not the receiver has correctly received the control information and data is acquired, and when the control information has been correctly received, control is conducted so that the second control information is not transmitted during the repeat frame transmission.

13 Claims, 19 Drawing Sheets

FIG. 2
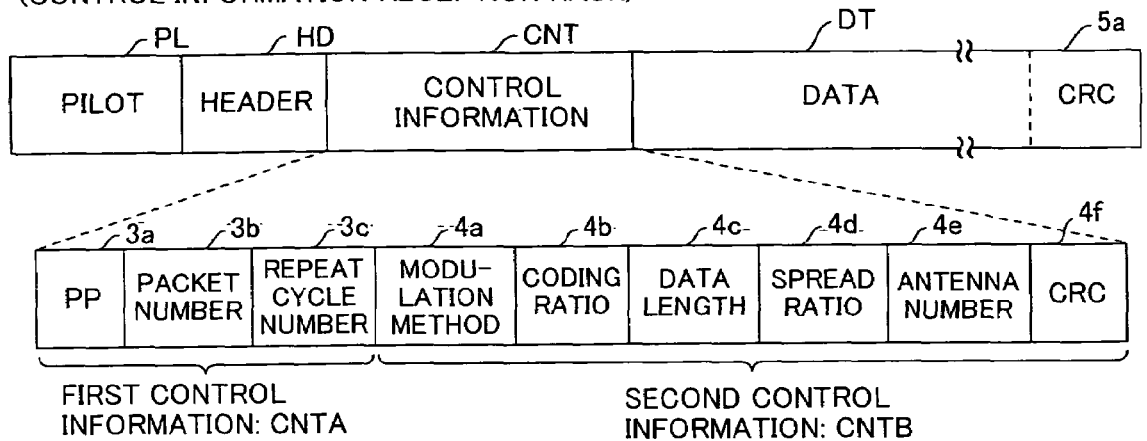
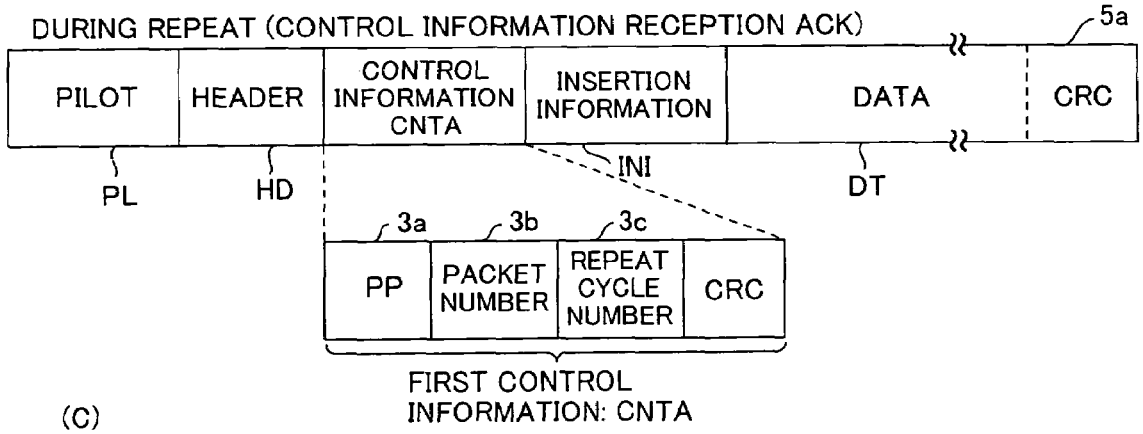
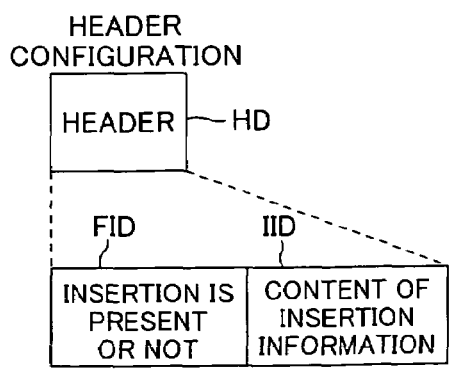

FIG. 7
(A)
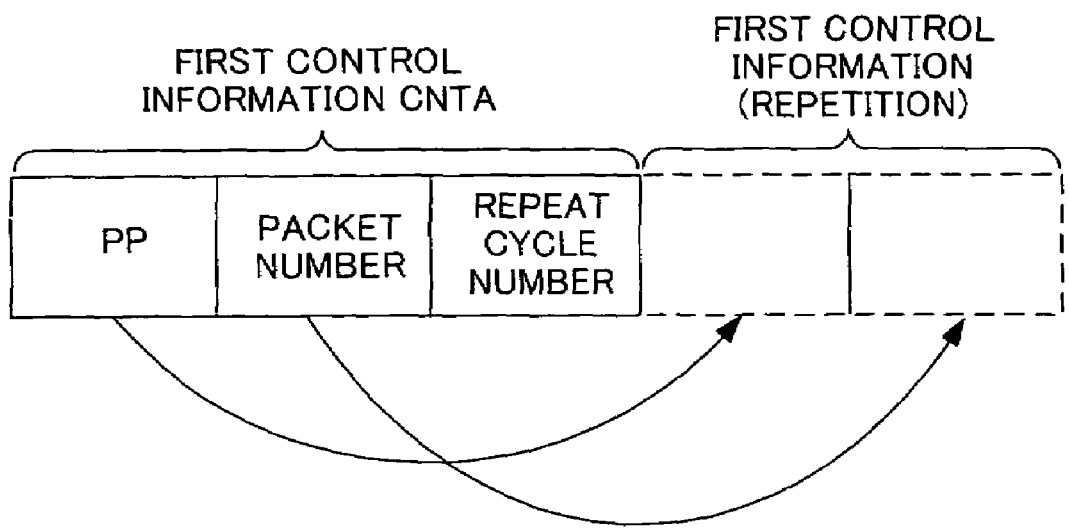
(B)
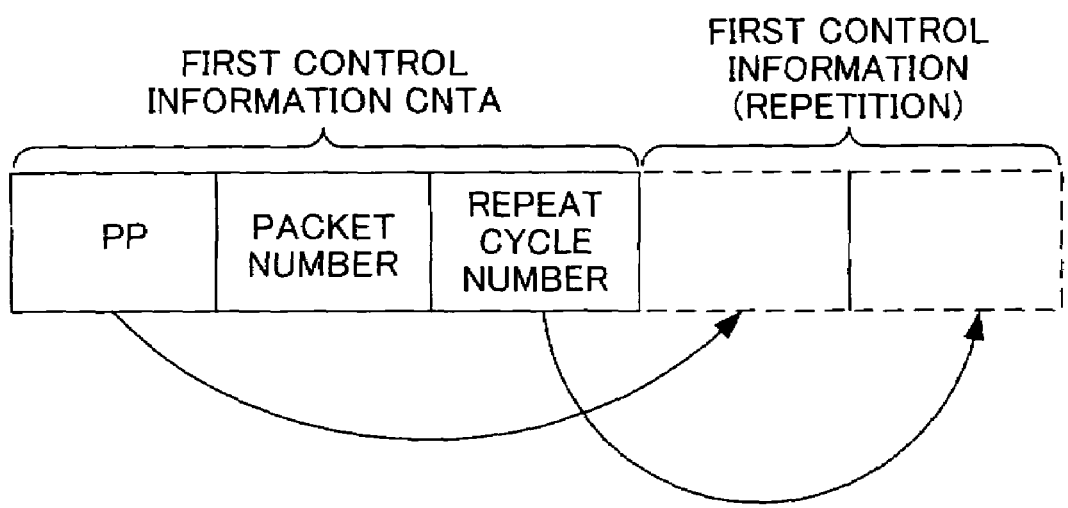

FIG. 10
(A)
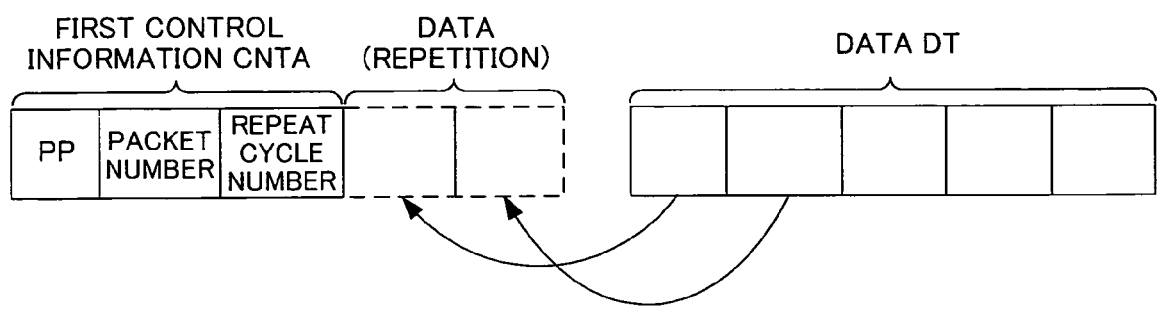
(B)
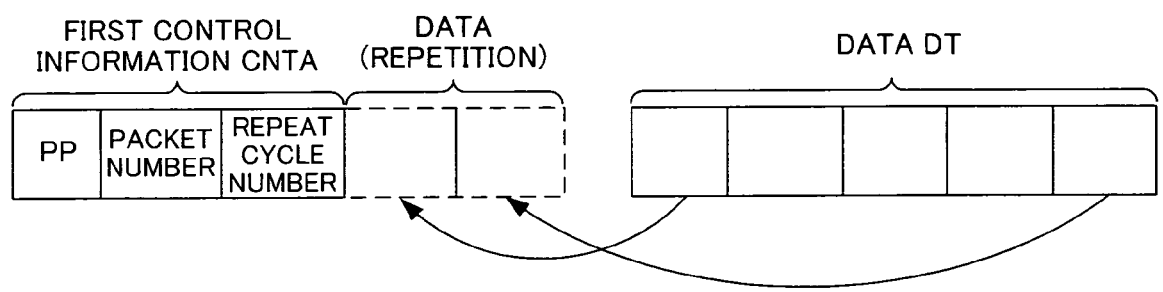

PP: PUNCTURING PATTERN

RETRANSMISSION CONTROL METHOD AND TRANSMITTER IN WIRELESS COMMUNICATION SYSTEM

BACKGROUND OF THE INVENTION

The present invention relates to a retransmission control method and a transmitter in a wireless communication system, and more particularly to a retransmission control method and a transmitter in a wireless communication system in which a frame comprising data and control information necessary for reception processing of the data is transmitted and, when a reception failure is notified, the frame that failed to be received is retransmitted.

Present wireless communication, which is focused on high-speed large-volume communication, requires a technology for compensating the errors in a wireless transmission zone to improve the throughput. Among such technologies, a method based on repeat control (ARQ: Automatic Repeat reQuest) is often used. FIG. 19 illustrates the repeat mode implemented with the ARQ method. The ARQ is a method in which an error detection code such as CRC (Cyclic Redundancy Check) assigned to a transmission frame (packet) is used, error detection is conducted for each packet, if no error is present in the received packet, an ACK signal is returned to the transmission side, and a new packet transmission is requested. However, when the presence of an error is established, a NACK (Not-ACKnowledge) signal is returned and the same packet is requested to be repeated. In the figure, the RTT (Round Trip Time) is the time from the transmission of the initial packet to the repeat of this packet or transmission of the next packet.

A HARQ (Hybrid-ARQ) method is the development of the ARQ method (D. Chase, "Code Combining—A Maximum-Likelihood Decoding Approach for Combining an Arbitrary Number of Noisy Packets", IEEE Trans. Commun., vol. 33, pp. 385-393, May, 1985). FIG. 20 is an explanatory drawing illustrating the HARQ method using a packet synthesis. With the HARQ method, after an error correction has been conducted, error detection is carried out for each packet by using, e.g., a CRC assigned to the tail of the transmission packet. If an error is detected, a NACK signal is returned to the transmission side and the repeat of the same packet is requested. At this time, the reception signal of the packet for which the error was detected is inputted in a buffer at the reception side. According to the HARQ method, the reception results of the repeated packet and the reception signal of the initially transmitted packet are synthesized. As a result, the reception characteristic can be further improved by using the gain of error correction coding.

FIG. 21 is a structural diagram of a signal modulation unit in a transmitter of a packet transmission system employing the HARQ method. FIG. 22 is a structural diagram of a signal demodulation unit in a receiver.

In the signal modulation unit of the transmitter shown in FIG. 21, a turbo coding unit 1a conducts turbo coding of transmission data. The coding ratio R of turbo coding is a constant, R=1/3. A punctured coding unit 1b attains the required coding ratio (for example, R=3/4) by using the prescribed puncturing pattern. The data modulation unit 1c conducts data modulation corresponding to the modulation method (multivalue modulation method). Generally, there are QPSK, 16QAM, and 64QAM modulation methods. The spread unit 1d multiplies the modulated signal by a spread code and spreads the signal correspondingly to a spread ratio.

The signal demodulation unit of the receiver shown in FIG. 22 is configured to conduct repeat synthesis prior to punctured decoding. A reverse spread unit 2a conducts a reverse spreading by multiplying the received signal by a reverse spread code identical to the spread code. Then, the data demodulation unit 2b carries out data demodulation corresponding to the modulation method. The repeat synthesis unit 2c, if a repeat packet data is received, conducts synthesis of this repeat packet data and the packet data with the same packet number that was previously received. As a result, a higher reception quality can be obtained. The punctured decoding unit 2d conducts punctured decoding corresponding to the coding ratio by using a puncturing pattern, and the turbo decoding unit 2e conducts turbo coding.

FIG. 23 shows an example of signal modulation in the signal modulation unit (FIG. 21). Here, the modulation method is 16 QAM and the coding ratio R is 3/4. The transmission data is denoted by A and 6-bit data A1-A6 is considered. If the coding ratio in turbo coding is taken as 1/3, the coded data become B1-B18. In the puncturing pattern PP corresponding to the coding ratio 3/4, "1" appears in 8 bits of the 18 bits. Data B1-B7 and B16 corresponding to "1" of the pattern PP become the punctured coded data and are outputted as C1-C8 (rate matching). Because the original 6 bit data become 8 bit data, a coding ratio of 3/4 is attained. In data modulation, the 16 QAM modulation is executed, and E1, E2 data are produced. The data obtained by the data modulation is spread according to the spread ratio.

FIG. 24 shows an example of signal demodulation in the signal demodulation unit (FIG. 22). The processing flow herein is reversed with respect to that shown in FIG. 23. First, the received data are subjected to 16QAM demodulation and data C1-C8 are acquired. Then, punctured decoding is conducted by using the puncturing pattern PP. In this punctured decoding, data C1-C8 are written in positions corresponding to "1" in the puncturing pattern PP, and a turbo code with a coding ratio of 1/3 is obtained (derate matching). As a result, the original 6 bit data A1-A6 are decoded by conducting turbo decoding of the punctured decoded data.

FIG. 25 is the conventional example of a frame format used in repeat control of HARQ. FIG. 26 is an explanatory drawing illustrating the conventional frame repeat mode. One frame comprises a pilot PL, control information CNT, and data (including CRC) DT. The control information CNT serves for correct demodulation and decoding of the data at the receiving station and specifies the modulation method, coding ratio, puncturing pattern (PP), data length, spread ratio, antenna number (diversity), packet number, and number of repeat cycles. With the conventional method, if a repeat is requested from a receiving station, then a transmitting station modifies, if necessary, a portion of control information, such as the puncturing pattern (PP), packet number, or repeat cycle number, of the control information of the repeat frame and then carries out the frame repeat.

However, with the conventional retransmission control method, the control information that is the same during the new data transmission and during the repeat, for example, the modulation method, coding ratio, data length, and spread ratio is also repeated. As a result, because the control information that is not required to be repeated is resent, the unnecessary control information is present. In the next-generation mobile communication system, the delay has to be shortened and the packet transmission efficiency has to be increased by using packets with a short frame length. Therefore, if such unnecessary control information is present, the overhead of control information becomes large and the amount of data and pilot that can be transmitted in one packet is reduced. If the amount of data is reduced, the amount of transmitted information is decreased, thereby directly reducing the throughput. Furthermore, if the amount of pilot is decreased, then the channel estimation accuracy is decreased, decoding error occurs, and the number of repeat cycles increases. If the number of repeat cycles increases, the throughput also decreases. Therefore, in communication systems using packets with a short frame length, a retransmission control reducing the transmission of unnecessary control information is required to increase the throughput of the system and conduct high-speed transmission.

A technology has been suggested for conducting a repeat without interrupting the transmission (JP 03-262225A). In this conventional technology, the repeat is conducted by using an empty area of the transmission format and the unused channel and repeat processing can be conducted without stopping the transmission of information or reducing the transmission volume.

Furthermore, a technology has been suggested for increasing the throughput of the repeat transmission method (JP 2005-39726A). This conventional technology reduces the number of repeat cycles and increases the throughput by controlling an amount of transmission packet data that was requested to be repeated and accumulated in a buffer.

None of the conventional technologies relates to a retransmission control method for reducing the unnecessary transmission of control information.

SUMMARY OF THE INVENTION

Accordingly, it is an object of the present invention to reduce the unnecessary transmission of control information, increase the throughput of a communication system using a packet of a short frame length, and conduct high-speed transmission.

The present invention relates to a retransmission control method and a transmitter of a wireless communication system in which a frame comprising data and control information necessary for reception processing of the data is transmitted from a transmitter and, when a reception failure is notified by a receiver, the frame that failed to be received is retransmitted, and also to the wireless communication system.

Retransmission Control Method

The retransmission control method in accordance with the present invention comprises a step of classifying the control information into first control information that can be different for a new frame transmission and for a repeat frame transmission and second control information that is the same for a new frame transmission and a repeat frame transmission, a step of acquiring the information indicating whether or not the receiver has correctly received the control information and data, and a step of conducting control so that the second control information is not transmitted during the repeat when the control information has been correctly received. In the frame, the data, control information and pilot are transmitted by time-division multiplexing, or frequency multiplexing, or code multiplexing.

The retransmission control method in accordance with the present invention can further comprise a step of additionally providing the frame with an identification information for identifying whether or not the second control information is contained.

The retransmission control method in accordance with the present invention can further comprise a step of inserting a pilot, or the first control information, or the data into an empty space that appears because the second control information is not transmitted and conducting transmission with duplication thereof.

The retransmission control method in accordance with the present invention can further comprise a step of checking whether each of the control information and data was correctly received each time the frame is received and conveying the check results to the transmitter, and a step of identifying whether the second control information is contained in the frame based on the identification information contained in the frame, and when the second control information is contained in the frame, conducting the reception control of the data based on the received first and second control information and storing the second control information, and a step of conducting the reception control of the data based on the received first control information and the second control information that has been stored if the second control information is not contained in the frame.

Transmitter

The transmitter in accordance with the present invention comprises a control information generation unit for generating first control information that can be different for a new frame transmission and a repeat frame transmission and second control information that is the same for a new frame transmission and a repeat frame transmission, a control unit for acquiring the information indicating whether or not the receiver has correctly received the control information and data and, when the control information has been correctly received, conducting control so that the second control information is not transmitted during the repeat, and a transmission unit for transmitting a frame in which the data and the control information are multiplexed. The transmission unit transmits the data, control information and pilot by time-division multiplexing, or frequency multiplexing, or code multiplexing.

The transmitter in accordance with the present invention can further comprise an identification information generation unit for generating identification information for identifying whether or not the second control information is contained, and the transmission unit can transmit the identification information, data, and control information with multiplexing.

The transmitter in accordance with the present invention can further comprise an insertion unit for inserting a pilot, or the first control information, or the data into an empty space that appears because the second control information is not transmitted.

Wireless Communication System

The wireless communication system comprises a transmitter and a receiver, wherein the transmitter comprises a control information generation unit for generating first control information that can be different for a new frame transmission and a repeat frame transmission and second control information that is the same for the new frame transmission and the repeat frame transmission, a control unit for acquiring the information indicating whether or not the receiver has correctly received the control information and data and, when the control information has been correctly received, conducting control so that the second control information is not transmitted during the repeat, an identification information generation unit for generating identification information for identifying whether or not the second control information is contained in the frame; and a transmission unit for transmitting a frame in which the data, the control information, and the identification information are multiplexed, and the receiver comprises a receiving unit for receiving the frame, a normal reception check unit for checking whether the control information and data have been correctly received for each reception of the frame and conveying the check results to the transmitter, a control information storage unit for storing the second control information contained in the frame, and a reception control unit for identifying whether the second control information is contained in the frame based on the identification information contained in the frame and, when the second information is contained in the frame, conducting reception control of the data based on the received first and second control information and storing the second control information, and when the second information is not contained in the frame, conducting the reception control of the data based on the first control information that has been received and the second control information that has been stored.

With the retransmission control method, transmitter, and wireless communication system in accordance with the present invention, the control information is classified into the first control information that can be different for a new frame transmission and a repeat frame transmission and the second control information that is the same for the new frame transmission and the repeat frame transmission, the information indicating whether or not the receiver has correctly received the control information and data is acquired, and control is conducted so that the second control information is not transmitted during the repeat when the control information has been correctly received. Therefore, unnecessary transmission of control information is reduced.

Furthermore, with the retransmission control method, transmitter, and wireless communication system in accordance with the present invention, a pilot, or the first control information, or the data is inserted into an empty space that appears because the second control information is not transmitted and the transmission is conducted with duplication thereof. Therefore, the detection accuracy of information that is transmitted with duplication is increased and the number of error detections can be reduced. As a result, the throughput of the communication system using a packet with a short frame length can be increased and high-speed transmission can be conducted.

Furthermore, with the retransmission control method and transmitter in accordance with the present invention, because the identification information for identifying whether the second control information is contained is added to the frame, the reception unit can carry out the reception control by determining whether the second control information is present based on the identification information.

Furthermore, with the retransmission control method and transmitter in accordance with the present invention, because the data, control information and pilot are time-division multiplexed, frequency multiplexed, or code multiplexed, when the empty space of the second control information is not used, the transmission power can be reduced, interference caused by the decrease in the frequency used can be decreased, and the number of codes used can be reduced.

Other features and advantages of the present invention will be apparent from the following description taken in conjunction with the accompanying drawings.

BRIEF DESCRIPTION OF THE DRAWINGS

FIG. 2 is an explanatory drawing of a frame format of the present invention;

FIG. 7 is an explanatory drawing illustrating an insertion method of the first control information CNTA;

FIG. 10 is an explanatory drawing illustrating an insertion method of data;

DESCRIPTION OF THE PREFERRED EMBODIMENTS (A) Principle of the Invention

Figure 1:
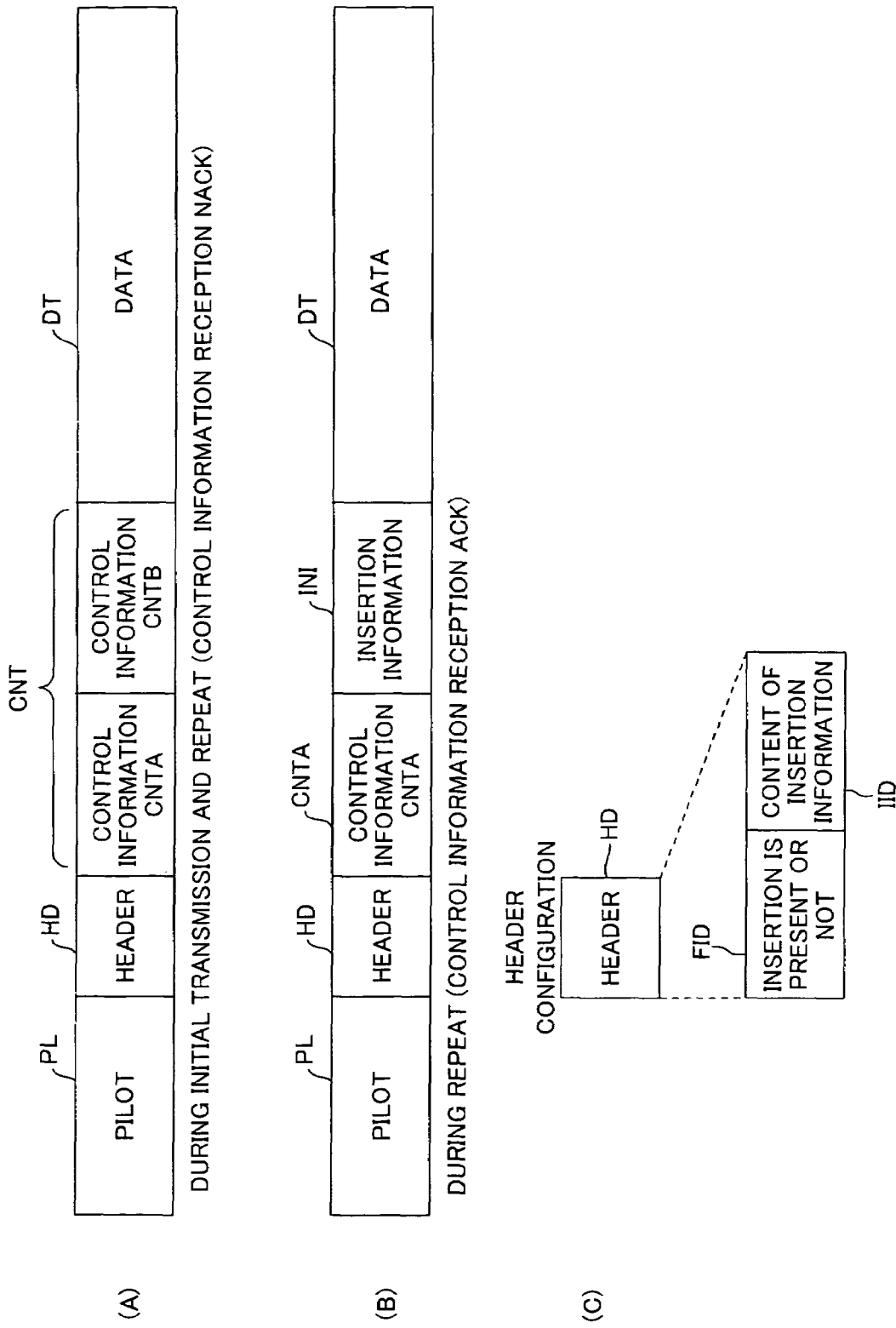
FIG. 1 is an explanatory drawing of a frame format for explaining the best mode for implementing the present invention.

FIG. 1 is an explanatory drawing of a frame format for explaining the best mode for implementing the present invention. (A) of FIG. 1 is a frame format during the initial frame transmission and during the frame repeat (control information reception failure), where the frame comprises a pilot PL, a header HD, control information CNT, and data DT. The control information CNT comprises the first control information CNTA and the second control data CNTB. The first control information CNTA is the control information that can be different during a new frame transmission and a repeat frame transmission, and the second control information CNTB is the same during the new frame transmission and the repeat frame transmission (B) of FIG. 1 is a frame format during the frame repeat (successful control information reception). The frame comprises a pilot PL, a header HD, the first control information CNTA, insertion information INI, and data DT. The insertion information INI is the information inserted into an empty space that appears because the second control data CNTB is not transmitted. The entire pilot or the first control information or data or part thereof is inserted into the empty space.

(C) of FIG. 1 is a configuration example of the header HD which comprises a first identification information (frame identification information) FID for identifying the frames of (A) and (B) and a second identification information (insertion identification information) IID that specifies the contents of the insertion information (whether pilot or the first control information or data).

After the frame transmission, the transmitter acquires from the receiver the information indicating whether or not the receiver has correctly received the control information and data. When the data has not been received correctly, but the control information CNT has been received correctly, the transmitter sends the frame shown in (B) during the repeat, and if the control information has not been received correctly, the transmitter transmits the frame shown in (A) during the repeat.

FIG. 2 is an explanatory drawing of a frame format of the present invention where (A) shows a frame format during the initial frame transmission and frame repeat (control information reception failure), (B) shows a frame format during the frame repeat (control information reception successful), and (C) shows the configuration example of the header HD.

The frame shown in (A) of FIG. 2 has a configuration obtained by time division multiplexing of a pilot PL, a header HD, control data CNT, and data DT. The control data CNT is divided into the first control information CNTA and second control data CNTB. The first control information CNTA is the control information that can be different during a new frame transmission and a repeat frame transmission and represents a puncturing pattern (PP) 3a, a packet number 3b, and a repeat cycle number 3c. The second control information CNTB is the same during the new frame transmission and the repeat frame transmission and represents a modulation method 4a, a coding ratio 4b, a data length 4c, a spread ratio 4d, and an antenna number 4e. CRC 4f, 5a for error detection are inserted independently for the control information CNT and data DT. The transmitter transmits the entire control information, that is, the first and second control information CNTA, CNTB during the initial frame transmission and frame repeat (control information reception failure).

(B) of FIG. 2 shows a frame format during the frame repeat (control information is successfully received) and has a configuration obtained by time division multiplexing of the pilot PL, header HD, first control information CNTA, insertion information INI, and data DT. The insertion information INI is the information inserted into an empty space that appears because the second control data CNTB is not transmitted. The entire pilot PL or the first control information CNTA or data DT or part thereof is inserted into the empty space. The figure illustrates the case where the pilot has been inserted. During the frame repeat (control information is successfully received), the transmitter transmits only the first control information CNTA as the control information.

(C) of FIG. 2 is a configuration example of the header HD which comprises the first identification information (frame identification information) FID for identifying the frames of (A) and (B) of FIG. 2 and the second identification information (insertion identification information) IID that specifies the contents of the insertion information INI (whether pilot or the first control information or data).

The transmitter classifies the control information in advance into (1) the first control information CNTA that can be different during the new frame transmission and the repeat frame transmission and (2) the second control information CNTB that is the same during the new frame transmission and the repeat frame transmission.

After the frame transmission, the transmitter acquires the information indicating whether or not the receiver has correctly received the control information CNT and data DT. (1) If the control information CNT and data DT has been received correctly, a new frame is transmitted, (2) if the data has not been received correctly, but the control information CNT has been received correctly, the frame shown in (B) of FIG. 2 is transmitted during the repeat, and (3) if the control information has not been received correctly, the frame shown in (A) of FIG. 2 is transmitted during the repeat.

In the case (2), transmitting the frame shown in (B) of FIG. 2 makes it possible to multiplex and transmit the pilot or the entire first control information CNTA or data or part thereof instead of the second control information CNTB. Therefore, useless transmission of control information is eliminated. Furthermore, the number of error detection can be reduced. As a result, the throughput of the communication system using a packet with a short frame length can be increased and high-speed transmission can be implemented.

Each time the frame is received from the transmitter, the receiver checks whether the control information and data have been received correctly by using the CRC and conveys the check results to the transmitter. Furthermore, the receiver identifies whether the second control information is contained in the frame based on the frame identification information FID of the header HD contained in the frame, and when the second control information is contained in the frame, the receiver conducts the reception control of data based on the received first and second control information CNTA, CNTB and also stores the second control information CNTB. If the second control information is not contained in the frame, the receiver conducts the reception control of data based on the received first control information CNTA and the stored second control information CNTB. Furthermore, the receiver identifies the information that is sent instead of the second control information based on the insertion identification information IID of the header HD and conducts the synthesis of this information with the regularly sent information.

(B) First Embodiment (a) Transmitter

Figure 3:
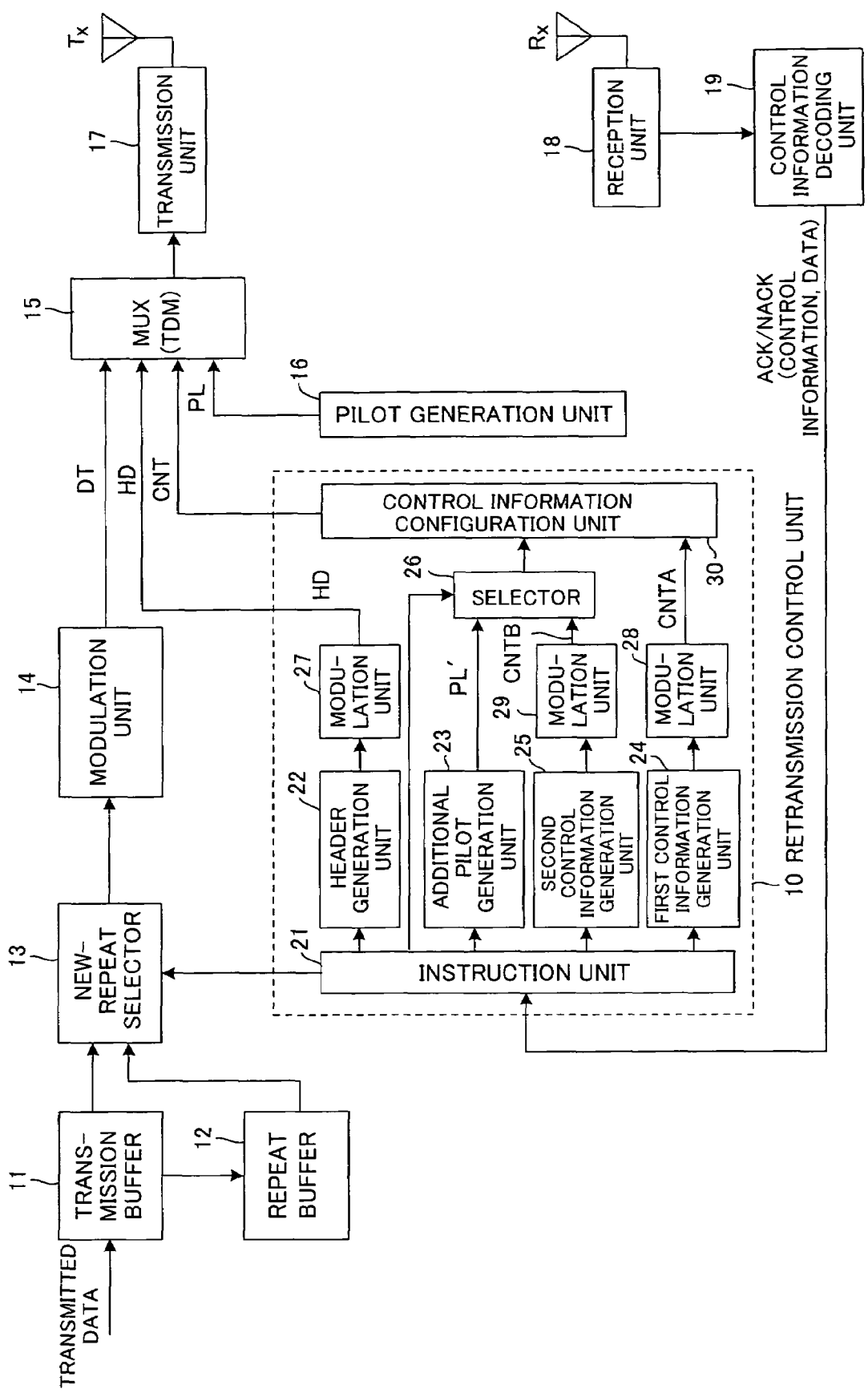
FIG. 3 is a configuration example of the transmitter in accordance with the present invention.

FIG. 3 shows a configuration example of the transmitter in accordance with the present invention. In this case, transmission is executed using a frame format in which a pilot PL, a header HD, control information CNT, and data DT are multiplexed in the time division. The information inserted into an empty space during the repeat is taken as a pilot.

Figure 21:
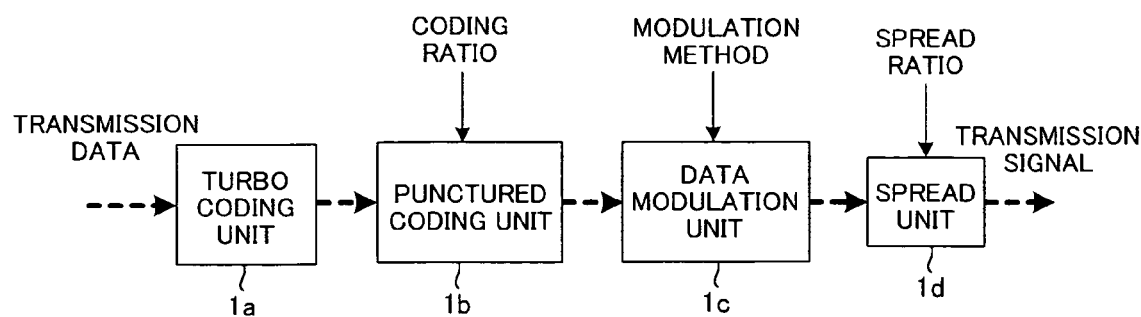
FIG. 21 is a structural drawing of a signal modulation unit in a transmitter of a packet transmission system employing the HARQ method.
Figure 22:
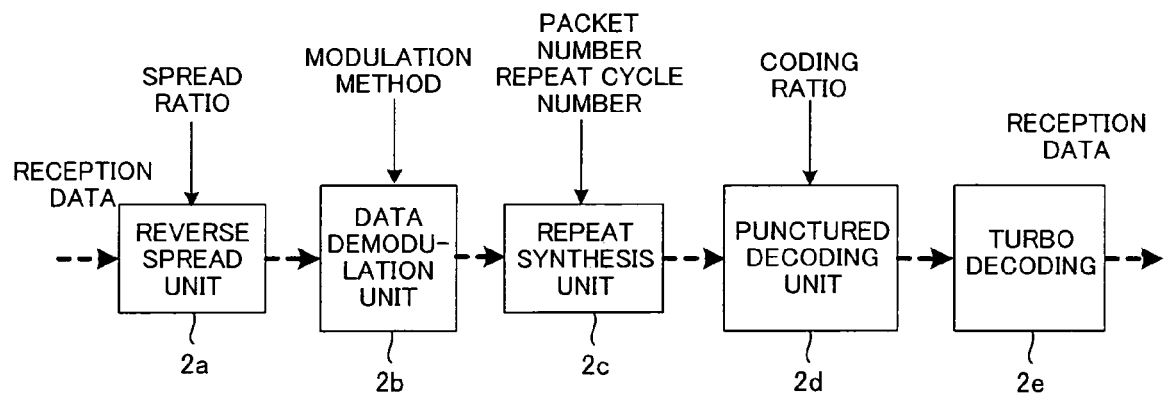
FIG. 22 is a structural drawing of a signal demodulation unit in the receiver.
Figure 23:
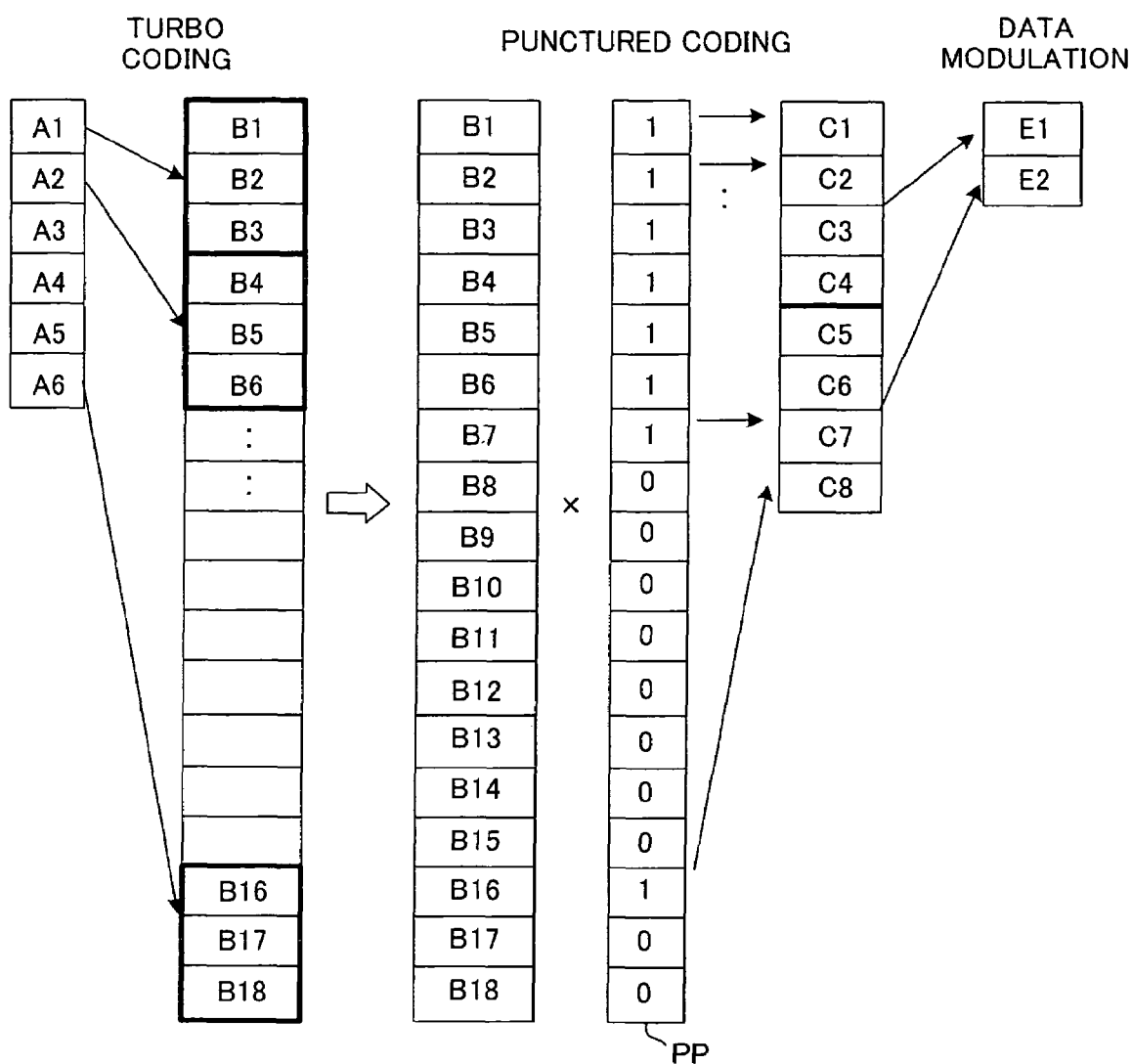
FIG. 23 is an example of signal modulation of the signal modulation unit.
Figure 24:
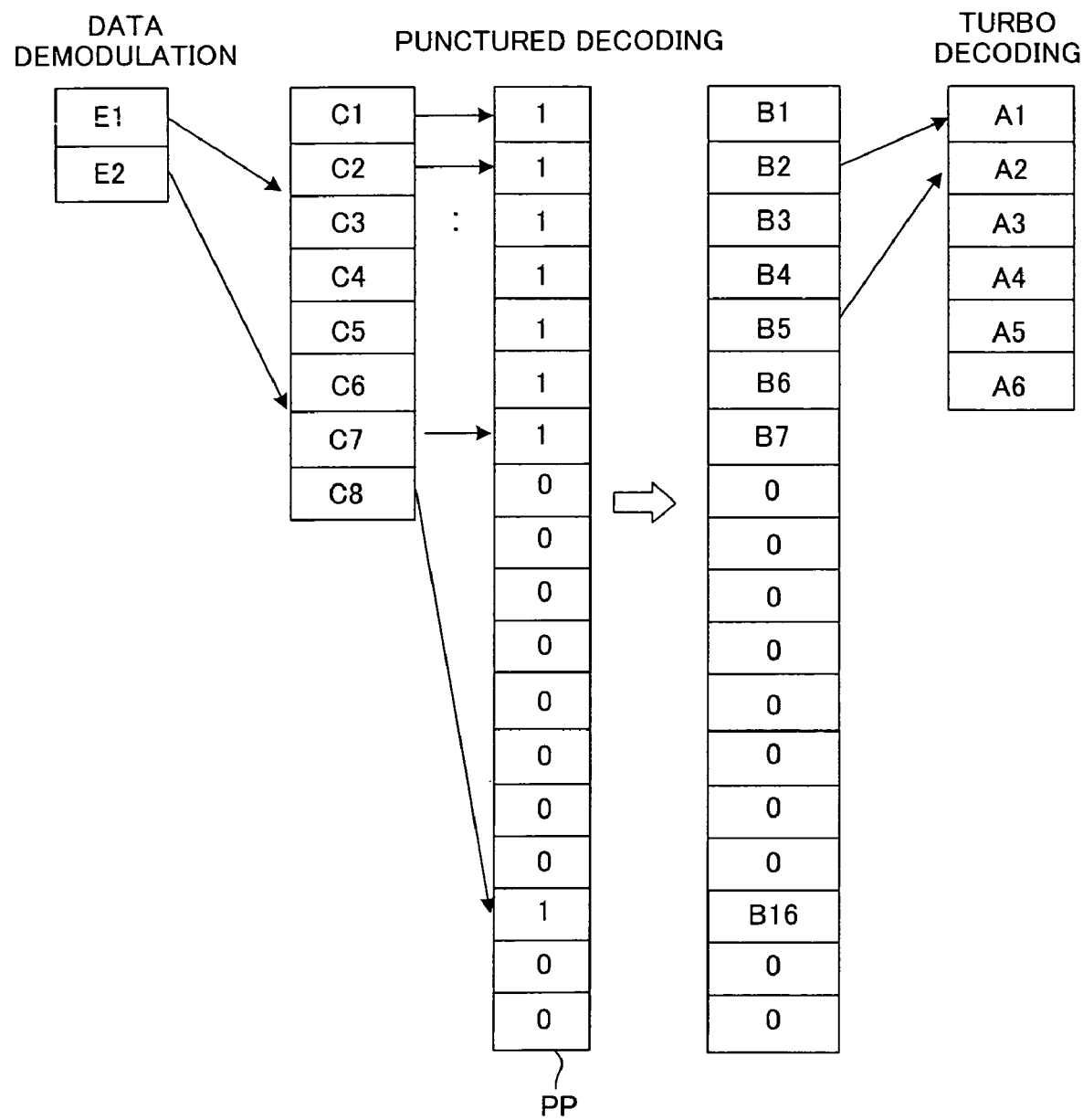
FIG. 24 is an example of signal demodulation of the signal demodulation unit.
Figure 25:
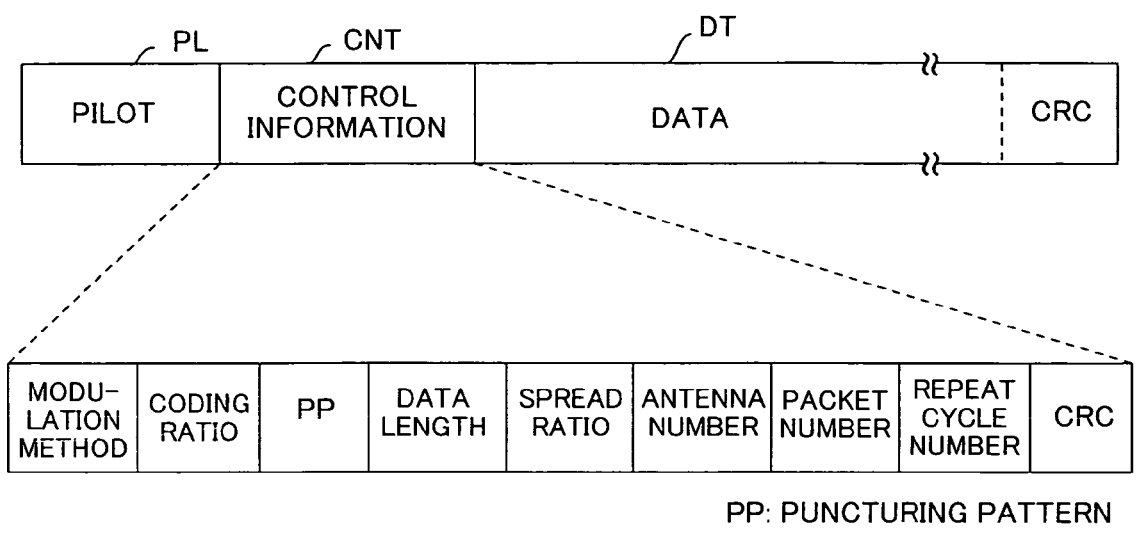
FIG. 25 is a conventional example of frame format used in HARQ repeat control.
Figure 26:
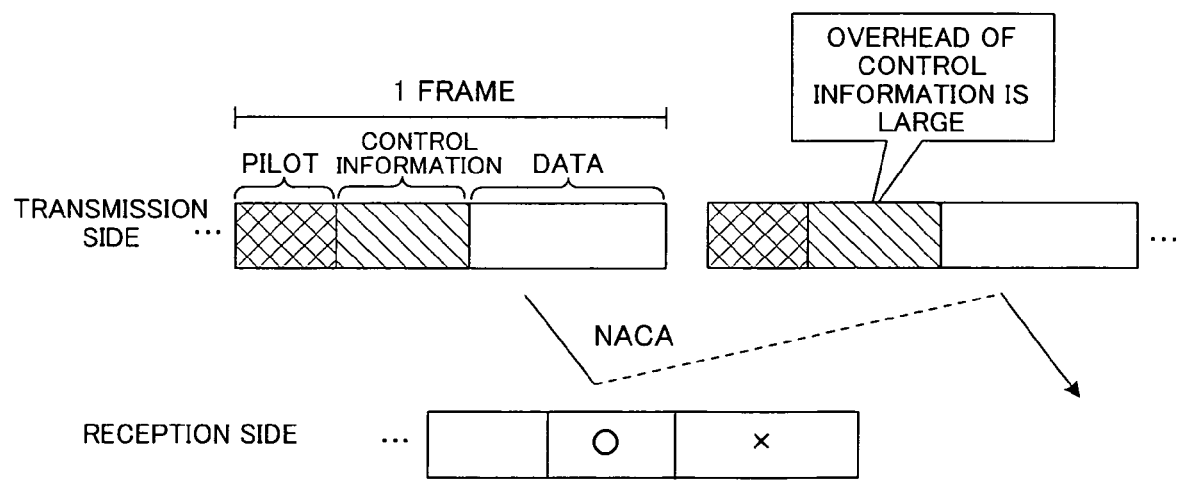
FIG. 26 is an explanatory drawing illustrating the conventional frame repeat mode.

A scheme of the repeat in accordance with the present invention will be explained step-by-step below from the case where new data is transmitted. A transmission buffer 11 and a repeat buffer 12 sequentially store the data that is to be transmitted. A new-repeat selector 13 selects the new data from the transmission buffer 11, in accordance with the instruction from an instruction unit 21 of a retransmission control unit 10 and inputs the selected data into a modulation unit 14. The modulation unit 14 modulates the transmission data as shown in FIG. 21 and inputs the modulated data into a multiplexing unit (MUX unit) 15.

In parallel with the above-described operations, when new data is transmitted, the instruction unit 21 of the retransmission control unit 10 inputs information for informing that new data is transmitted, to a header generation unit 22, an additional pilot generation unit 23, a first control information generation unit 24, a second control information generation unit 25, and a selector 26. As a result, the header generation unit 22 produces a header comprising a frame identification information FID specifying that the frame has a format shown in (A) of FIG. 2. This header is modulated by the modulation unit 27 and inputted to the MUX unit 15. Furthermore, the first and second control information generation units 24, 25 generate first and second control information CNTA, CNTB that is modulated by modulation units 28, 29 and outputted. A selector 26 selects the second control information CNTB outputted from the modulation unit 29. A control information configuration unit 30 produces control information CNT based on the first and second control information outputted from the selector 26 and modulation unit 28 and inputs the produced control information to the MUX unit 15.

The MUX unit 15 creates a frame by time multiplexing the transmission data DT, header HD and control information CNT outputted from the retransmission control unit 10 and pilot PL generated from the pilot generation unit 16. The transmission unit 17 sends the framed packet from the transmission antenna Tx.

Then, the transmitter waits for the return of an ACK/NACK signal specifying normal or abnormal reception of the transmitted frame (packet) from the receiver. The receiver monitors whether or not the reception was normal for each control information CNT and data DT of the frame, and transmits the respective ACK/NACK signals.

The reception unit 18 of the transmitter receives the signal transmitted by the receiver from the reception antenna RX, converts the received signal into a base band signal, and inputs it into a control signal demodulation unit 19. The control signal demodulation unit 19 demodulates the control signal and inputs the ACK/NACK signal for each control information CNT and data DT transmitted by the transmitter to the instruction unit 21 of the retransmission control unit 10.

If both the control information CNT and the data DT have been received normally, the instruction unit 21 inputs the above-described signal into each unit, thereby instructing to transmit a new frame. As a result, the transmitter transmits a new frame by operating in absolutely the same manner as described above.

However, if the control information has not been normally received, the instruction unit 21 sends a repeat instruction to the new-repeat selector 13 and also inputs information about the repeat due to abnormal reception of control data to the header generation unit 22, additional pilot generation unit 23, first control information generation unit 24, second control information generation unit 25, and selector 26. As a result, the retransmission control unit 10 executes thereafter operations identical to those of the new transmission, produces control information CNT and input this information into the MUX unit 15. The MUX unit 15 creates a frame shown in (A) of FIG. 2 by conducting time multiplexing of the repeat transmission data DT, header HD and control information CNT outputted from the retransmission control unit 10 and pilot PL generated from the pilot generation unit 16. The transmission unit 17 sends this framed packet from the transmission antenna Tx.

On the other hand, if the control information has been received normally, but data has not been received normally, the instruction unit 21 instructs the new-repeat selector 13 to select repeat and also inputs information about the repeat due to abnormal reception of data (control information is received normally) to the header generation unit 22, additional pilot generation unit 23, first control information generation unit 24, second control information generation unit 25, and selector 26. As a result, the header generation unit 22 produces a header HD comprising frame identification information FID specifying that the frame has a format shown in (B) of FIG. 2 and insertion identification information IID specifying that the insertion information is a pilot. The produced header is modulated by the modulation unit 27 and inputted to the MUX unit 15. Furthermore, the first control information generation unit 24 generates first control information CNTA and this information is modulated by the modulation unit 28 and outputted. Furthermore, the additional pilot generation unit 23 generates and outputs an additional pilot PL'. The selector 26 selects the additional pilot PL' outputted from the additional pilot generation unit 23, and the control information configuration unit 30 produces control information CNT by combining the additional pilot signal PL' and first control information respectively outputted from the selector 26 and modulation unit 28 and inputs this information to the MUX unit 15.

The MUX unit 15 configures a frame shown in (B) of FIG. 2 by time multiplexing the transmission data DT, header HD and control information CNT outputted from the retransmission control unit 10 and pilot PL generated from the pilot generation unit 16. The transmission unit 17 sends the framed packet from the transmission antenna Tx.

(b) Receiver

Figure 4:
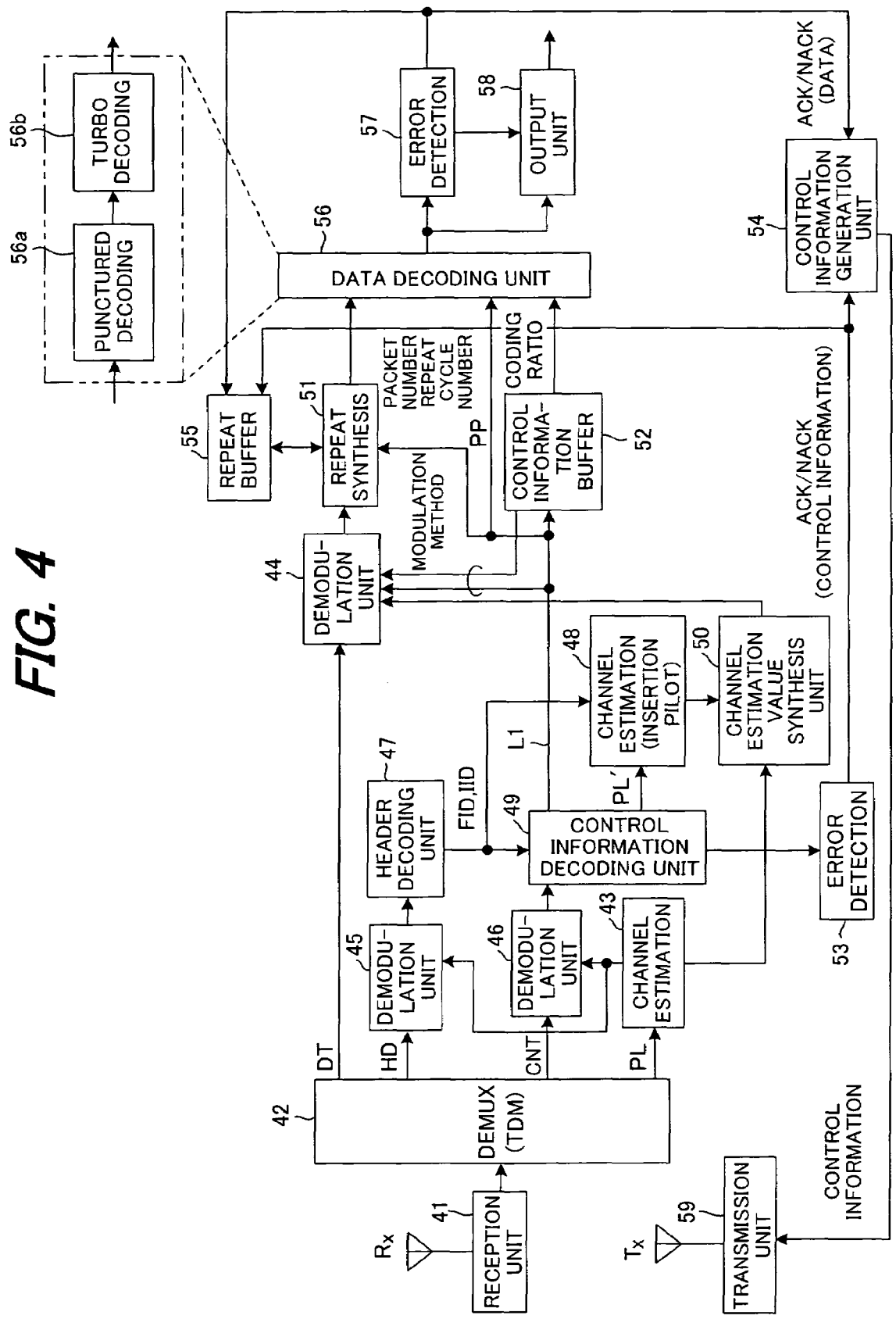
FIG. 4 shows a configuration example of the receiver of the present invention.

FIG. 4 shows a configuration example of the receiver in accordance with the present invention. First, the reception of a new frame shown in (A) of FIG. 2 will be described.

The reception unit 41 receives via the reception antenna Rx a frame signal transmitted from the transmitter, converts the received signal into a base band frequency, and inputs it to a separation unit (DEMUX unit) 42. The DEMUX unit 42 separates the received frame signal into the pilot PL, header HD, control information CNT, and data DT and inputs them successively into each unit. First, a channel estimation unit 43 determines a channel estimation value indicating the propagation path characteristic (channel characteristic) by using the pilot PL and inputs the channel estimated value to a header demodulation unit 45, a control information demodulation unit 46, and a channel estimated value synthesis unit 50.

The demodulation unit 45 executes channel compensation of the header signal separated by the DEMUX unit 42 using the channel estimation value and also demodulates the channel-compensated header signal. A channel decoding unit 47 decodes the header information (frame identification information FID, insertion identification information IID) and inputs it to a channel estimation unit 48 and a control information decoding unit 49.

The demodulation unit 46 execute channel compensation of the control information signal separated by the DEMUX unit 42 using the channel estimation value computed in the channel estimation unit 43, demodulates the channel-compensated control information signal, and inputs the demodulation results to the control information decoding unit 49. The control information decoding unit 49 recognizes that the frame shown in (A) of FIG. 2 has been received based on the header information (frame identification information FID, insertion identification information IID), outputs the first and second control information CNTA, CNTB to a line L1 and also inputs the information to an error detector 53. A control information buffer 52 connected to the line L1 stores the second control information CNTB (modulation method or coding ratio) of the control information, and the error detector 53 executes error detection of the control information based on the CRC and inputs an ACK/NACK signal indicating the error detection results to a control information generation unit 54.

After the channel estimation unit 48 recognizes that no pilot has been inserted based on the header information, the channel estimation unit does not executes channel estimation and the channel estimated value synthesis unit 50 directly inputs the channel estimated value that was estimated by the channel estimation unit 43 to a data demodulation unit 44.

The data demodulation unit 44 executes channel compensation of the data signal separated by the DEMUX unit 42 by using the channel estimated value estimated in the channel estimation unit 43 and also demodulates the channel-compensated data signal based on the demodulation method corresponding to the modulation method inputted from the line L1. Then, a repeat synthesis unit 51 synthesizes the demodulated data and data stored in a repeat buffer 55 considering the packet number and number of repeat cycles supplied from the line L1 and inputs the synthesis results to a data decoding unit 56. Because a new frame has been received, the data to be synthesized are not present in the repeat buffer 55.

The data decoding unit 56 comprises a punctured decoding unit 56a and a turbo decoding unit 56b, executes punctured decoding by using a coding ratio and a puncturing pattern (PP), also executes a turbo decoding, and inputs the decoding results into an error detection unit 57. The error detection unit 57 executes error detection processing by using the CRC contained in the data and inputs an ACK/NACK signal indicating the error detection results to the control information generation unit 54. The control information generation unit 54 inputs the ACK/NACK signal indicating the error detection results of the control information CNT and the ACK/NACK signal indicating the error detection results of the data into a transmission unit 59, and the transmission unit 59 transmits the ACK/NACK signals to the transmitter.

If no error is present in the control information and data, the repeat buffer 55 does not store the repeat synthesis results obtained in the repeat synthesis unit 51, but if an error is detected, the repeat buffer stores the repeat synthesis results.

It follows from the above that if no error is present in the control information and data, the output unit 58 outputs data and the repeat buffer does not store the repeat synthesis results. Furthermore, the control information generation unit 54 transmits to the transmitter an ACK signal indicating that no error is present in the control information and data. On the other hand, if an error is present in the control information or data, an output unit 58 outputs no data and the repeat buffer stores the repeat synthesis results. Furthermore, the control information generation unit 54 notifies the transmitter of the error detection results for the control information and data by the ACK/NACK signal.

The demodulation unit 44 or data decoding unit 56 knows which frame of those shown in (A) and (B) of FIG. 2 is presently received based on the header information (this is not specifically shown in FIG. 4).

(c) Reception Operation of a Repeat Frame

The case where a new frame shown in (A) of FIG. 2 was received was described above, but the receiver also operates practically in the same manner when a repeat frame shown in (A) of FIG. 2 is received. The difference is as follows:

(1) The frame received in a previous cycle or the repeat synthesis results of the previous cycle has been stored in the repeat buffer 55;

(2) The repeat synthesis unit 51 synthesizes data of the received repeat frame and the data stored in the repeat buffer 55 and inputs the synthesis results into the data decoding unit 56.

(3) The demodulation unit 44 demodulates using a decoding method corresponding to the modulation method stored in the control information buffer 52.

(4) The data decoding unit 56 executes decoding by referring to a coding ratio stored in the control information buffer 52.

The case where a repeat frame shown in (B) of FIG. 2 is received will be described below.

The receiver 41 receives via the reception antenna Rx a frame signal transmitted from the transmitter, converts the received signal into a base band frequency, and inputs it to the separation unit (DEMUX unit) 42. The DEMUX unit 42 separates the received frame signal into the pilot PL, header HD, control information (first control information and insertion information) CNT, and data DT and inputs them successively to each unit.

First, the channel estimation unit 43 determines a channel estimation value indicating the propagation path characteristic (channel characteristic) by using the pilot PL and inputs the channel estimated value to the header demodulation unit 45, control information demodulation unit 46, and channel estimated value synthesis unit 50.

The demodulation unit 45 executes channel compensation of the header signal separated by the DEMUX unit 42 using the channel estimation value and also demodulates the channel-compensated header signal. The channel decoding unit 47 decodes the header information (frame identification information FID, insertion identification information IID) and inputs it to the channel estimation unit 48 and control information decoding unit 49.

The demodulation unit 46 executes channel compensation of the control information signal separated by the DEMUX unit 42 using the channel estimation value computed in the channel estimation unit 43, demodutates the channel-compensated control information signal, and inputs the demodulation results to the control information decoding unit 49. The control information decoding unit 49 recognizes that the frame shown in (B) of FIG. 2 has been received based on the header information, thereby confirms that only the first control information CNTA has been inputted as the control information and that the additional pilot PL' has been inserted instead of the second control information CNTB as an insertion information INI, outputs the first control information CNTA to the line L1, inputs the additional pilot PL' to the channel estimation unit 48, and inputs the control information CNT to the error detection unit 53. The error detector 53 executes error detection of the control information CNT based on the CRC and inputs an ACK/NACK signal indicating the error detection results to the control information generation unit 54. The control information buffer 52 does not store the first control information CNTA that was outputted to the line L1.

After the channel estimation unit 48 recognizes that the additional pilot has been inserted based on the header information, the channel estimation unit executes channel estimation using the additional pilot PL' inputted from the control information decoding unit 49 and inputs the estimation results to the channel estimation value synthesis unit 50. The channel estimation value synthesis unit 50 computes a channel estimation value by synthesizing the channel estimation value estimated by the channel estimation unit 43 and the channel estimation value estimated by the channel estimation unit 48 and inputs the computed channel estimation value to the data demodulation unit 44.

The demodulation unit 44 executes channel compensation of the data signal separated by the DEMUX unit 42 using the channel estimated value outputted from the channel estimated value synthesis unit 50 and demodulates in accordance with the demodulation method corresponding to the modulation method inputted from the control information buffer 52. Then, a repeat synthesis unit 51 synthesizes the demodulated data and data having the same packet number that has been stored in the repeat buffer 55 and inputs the synthesis results to the data decoding unit 56.

The data decoding unit 56 executes the punctured decoding using a coding ratio inputted from the control information buffer 52 and a puncturing pattern (PP) inputted via the line L1 from the control information decoding unit 49, also executes the turbo decoding, and inputs the decoding results to an error detection unit 57. The error detection unit 57 executes the error detection processing by using the CRC contained in the data and inputs an ACK/NACK signal indicating the error detection results to the control information generation unit 54. The control information generation unit 54 inputs the ACK/NACK signal indicating the error detection results of the control information CNT and an ACK/NACK signal indicating the error detection results of the data to the transmission unit 59, and the transmission unit 59 transmits the ACK/NACK signals to the transmitter.

If no error is present in the control information and data, the repeat buffer 55 does not store the repeat synthesis results obtained by the repeat synthesis unit 51, but if an error is present, the repeat buffer stores the repeat synthesis results.

As described above, if no error is present in the control information and data, the output unit 58 outputs data and the repeat buffer 55 does not hold the repeat synthesis results. Furthermore, the control information generation unit 54 transmits to the transmitter an ACK signal indicating that no error is present in the control information and data. On the other hand, when an error is present in any of the control information and data, the output unit 58 does not output data and the repeat buffer 55 holds the repeat synthesis results. Furthermore, the control information generation unit 54 notifies the transmitter of the ACK/NACK signal that an error was detected in the control information or data.

In the first embodiment, a pilot is inserted into an empty space of the second control information during the repeat. As a result, in the receiver, the channel estimation value can be computed by using the inserted pilot PL' information and original pilot PL. Therefore, the channel estimation accuracy can be increased.

(C) Second Embodiment

Figure 5:
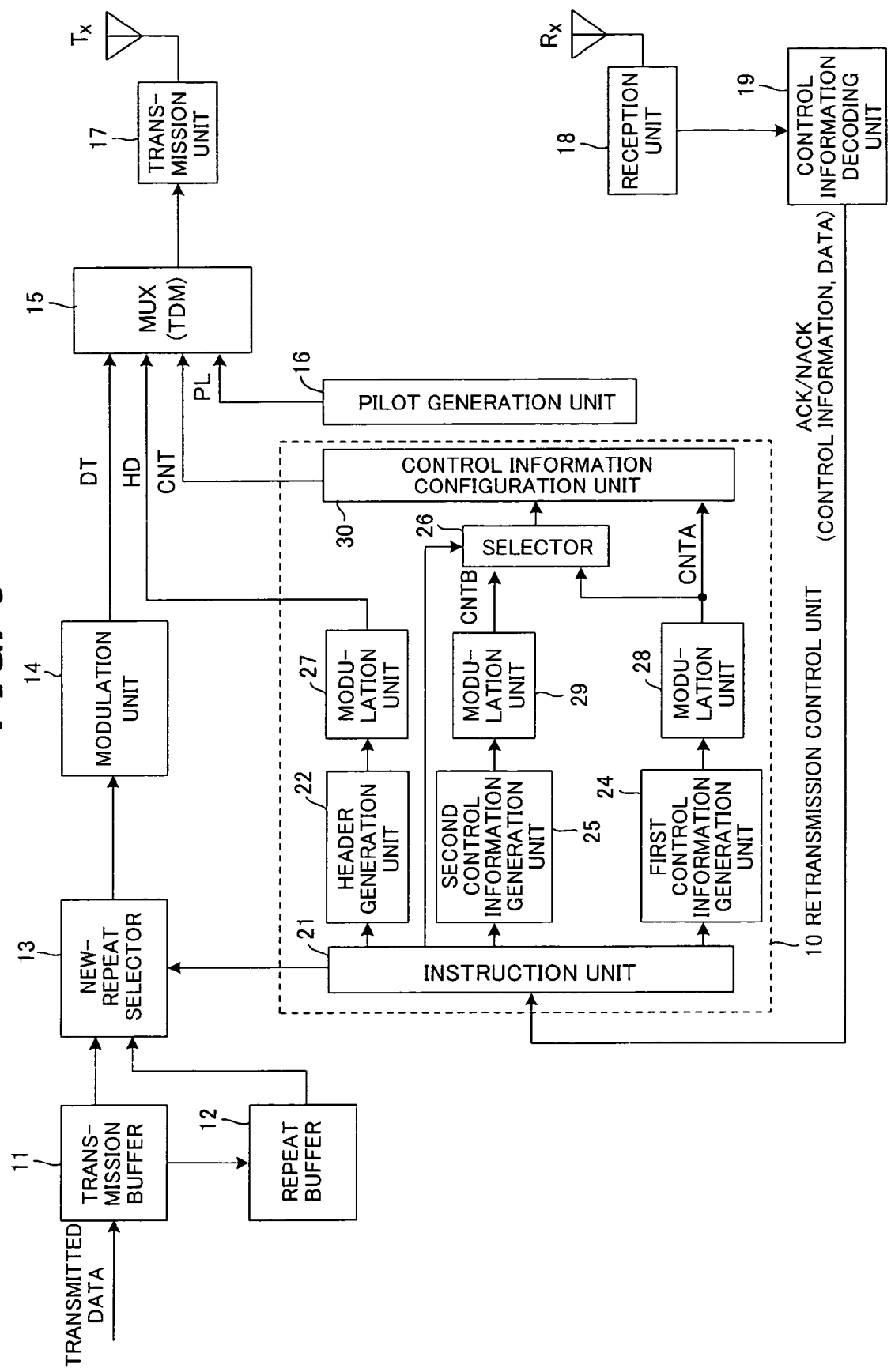
FIG. 5 is a transmitter of the second embodiment.
Figure 6:
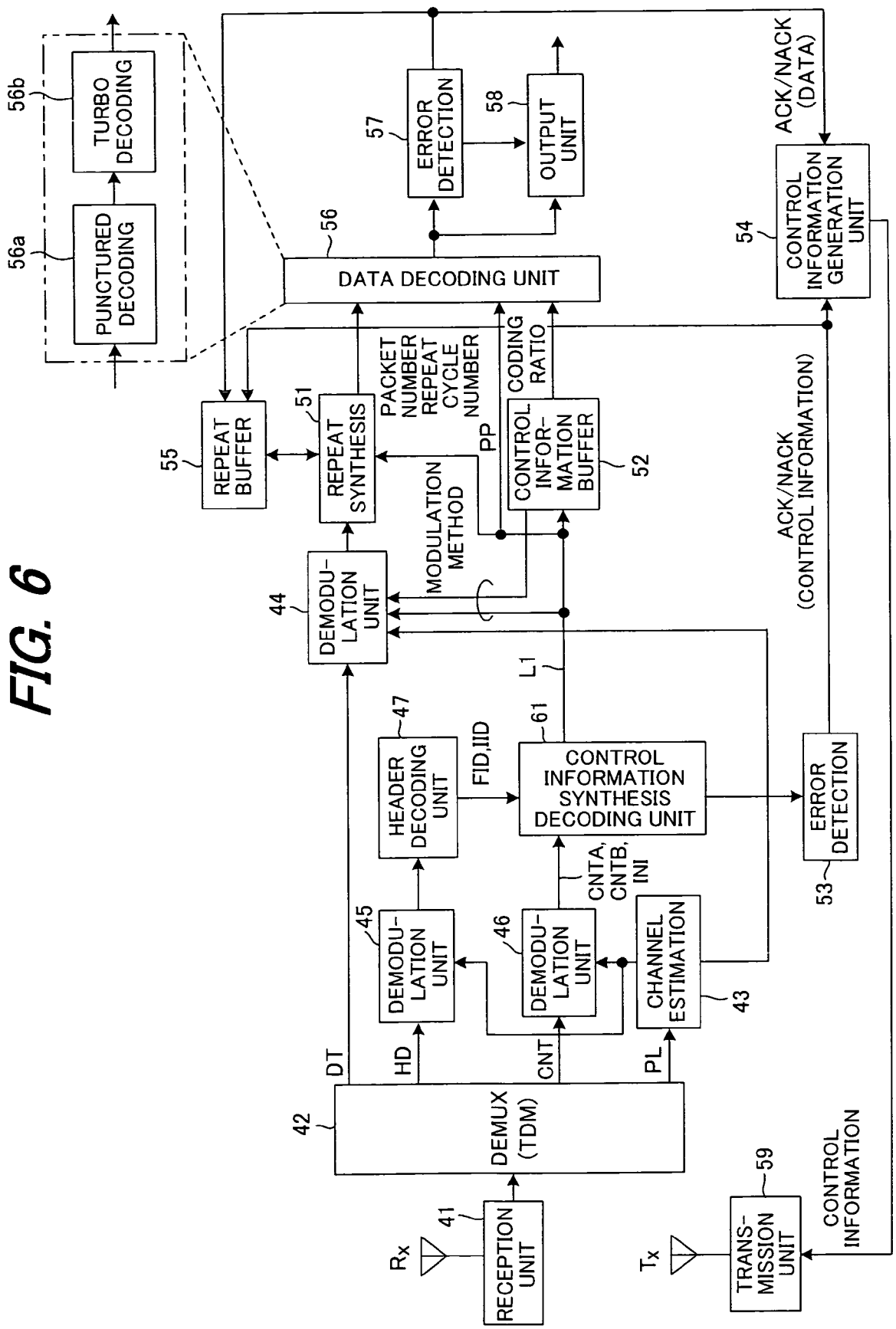
FIG. 6 is a receiver of the second embodiment.

FIG. 5 and FIG. 6 illustrate the configurations of the transmitter and receiver of the second embodiment in which the first control information CNTA is transmitted in duplicate using the insertion information INI. Components identical to those of the transmitter and receiver shown in FIG. 3 and FIG. 4 are assigned with identical reference numerals.

The difference between the transmitter (FIG. 5) of the second embodiment and the transmitter (FIG. 3) of the first embodiment is in that (1) the additional pilot generation unit 23 is eliminated, and (2) when the frame shown in (B) of FIG. 1 is repeated due to the reception failure of control information, the selector 25 selects the first control information CNTA and does not select the second control information CNTB. Thus, in the second embodiment, the transmitter transmits the first control information CNTA in duplicate using the insertion information INI shown in (B) of FIG. 1. The first control information CNTA is inserted into the empty space from head continuously, as shown in (A) of FIG. 7, or inserted into the empty space at random as shown in (B) of FIG. 7.

The difference between the receiver (FIG. 6) of the second embodiment and the receiver (FIG. 4) of the first embodiment is in that: (1) the channel estimation unit 48 and channel estimation value synthesis unit 50 are eliminated, and (2) a control information synthesis and decoding unit 61 is provided instead of the control information decoding unit 49.

The control information synthesis and decoding unit 61 recognizes that the frame shown in (B) of FIG. 1 was received and that the first control information CNTA has been inserted as the insertion information based on the header information, synthesizes the demodulation results of the two groups of the first control information CNTA and the insertion information on INI respectively inputted form the demodulation unit 46, and decodes the first control information from the result of the synthesis and outputs the demodulated first control information CNTA to the line L1. Furthermore, the control information synthesis and decoding unit 61 inputs the decoding results to the error detector 53. Other operations are identical to those of the first embodiment.

According to the second embodiment, because the first control information CNTA is inserted into the empty space in duplicate, the synthesis gain can be obtained by synthesizing, the decoding accuracy of the first control information CNTA is increased, and the error ratio characteristic can be reduced.

(D) Third Embodiment

Figure 8:
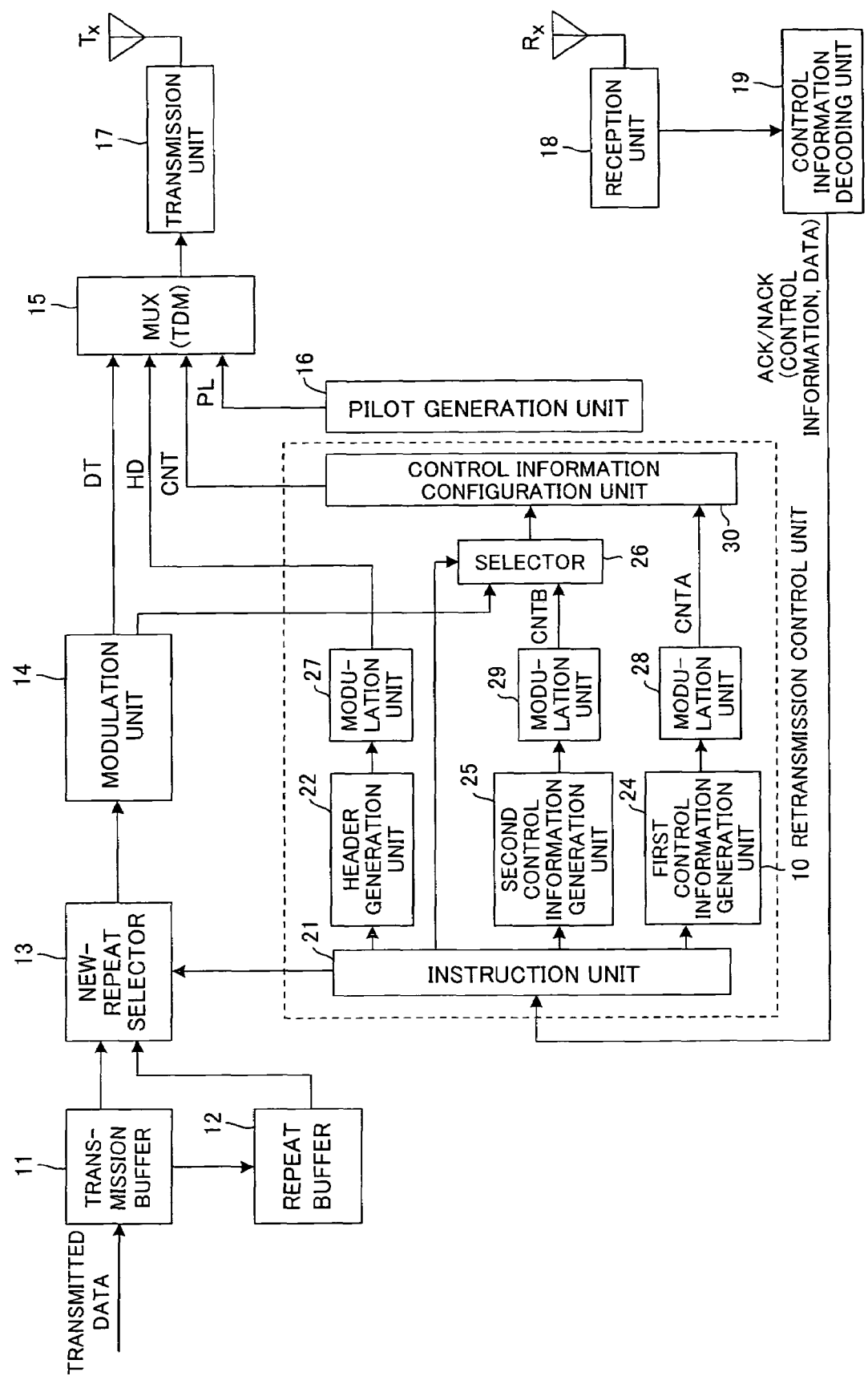
FIG. 8 is a transmitter of the third embodiment.
Figure 9:
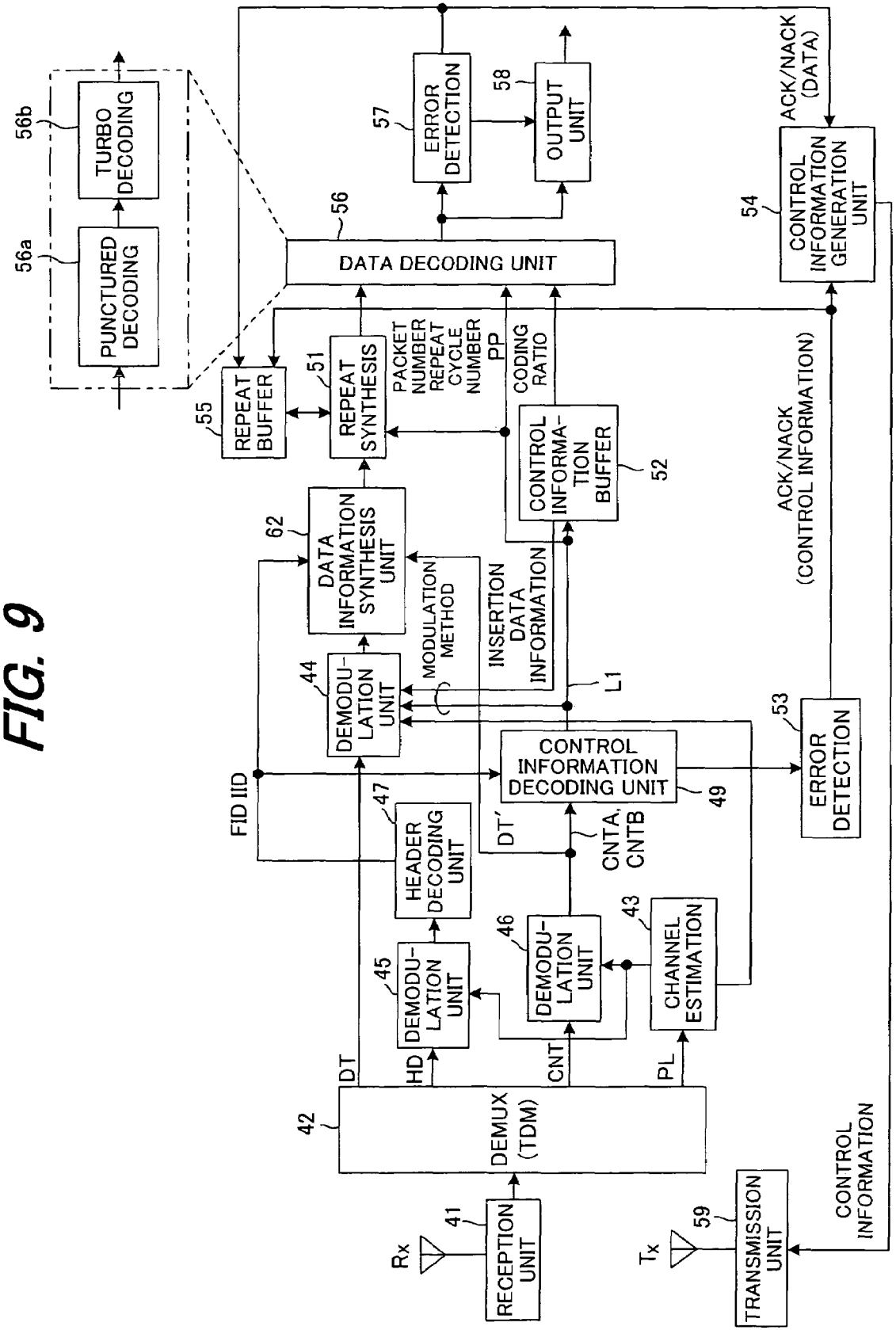
FIG. 9 is a receiver of the third embodiment.

FIG. 8 and FIG. 9 illustrate the configurations of the transmitter and receiver of the third embodiment in which part of data is transmitted as the insertion information. Components identical to those of the transmitter and receiver shown in FIG. 3 and FIG. 4 are assigned with identical reference numerals.

The difference between the transmitter (FIG. 8) of the third embodiment and the transmitter (FIG. 3) of the first embodiment is in that (1) the additional pilot generation unit 23 is eliminated, and (2) when the frame shown in (B) of FIG. 1 is repeated due to the reception failure of control information, the selector 26 selects part of data DT and does not select the second control information CNTB. Thus, in the third embodiment, the transmitter transmits part of data DT as the insertion information INI shown in (B) of FIG. 1. The data DT is inserted into the empty space from head continuously, as shown in (A) of FIG. 10 or inserted into the empty space at random as shown in (B) of FIG. 10.

The difference between the receiver (FIG. 9) of the third embodiment and the receiver (FIG. 4) of the first embodiment is in that: (1) the channel estimation unit 48 and channel estimation value synthesis unit 50 are eliminated, (2) a data information synthesis unit 62 is provided, and (3) a data demodulation signal inserted from the demodulation unit 46 is inputted to the data information synthesis unit 62.

The data information synthesis unit 62 recognizes that the frame shown in (B) of FIG. 1 was received and that data information DT' has been inserted as the insertion information INI based on the header information, synthesizes the data demodulation signal inputted from the demodulation unit 44 and data demodulation signal DT' inputted from the demodulation unit 46, and inputs the synthesized demodulation signal to the repeat synthesis unit 51. Other operations are identical to those of the first embodiment.

In the third embodiment, because the data is inserted into the empty space in duplicate, the synthesis gain can be obtained by synthesizing the decoding accuracy of the data is increased, and the error ratio characteristic can be reduced.

(E) Fourth Embodiment

Figure 11:
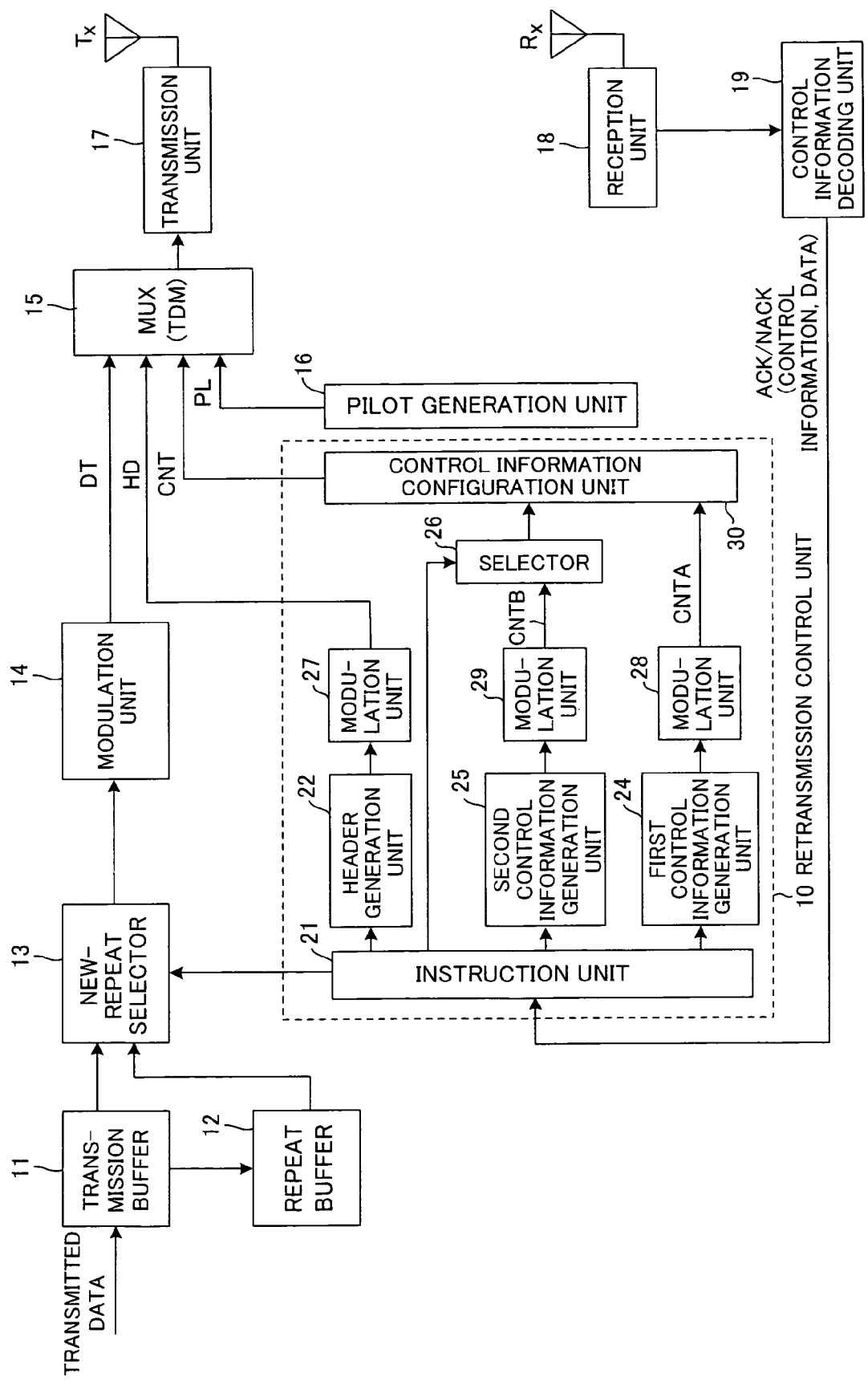
FIG. 11 is a transmitter of the fourth embodiment.
Figure 12:
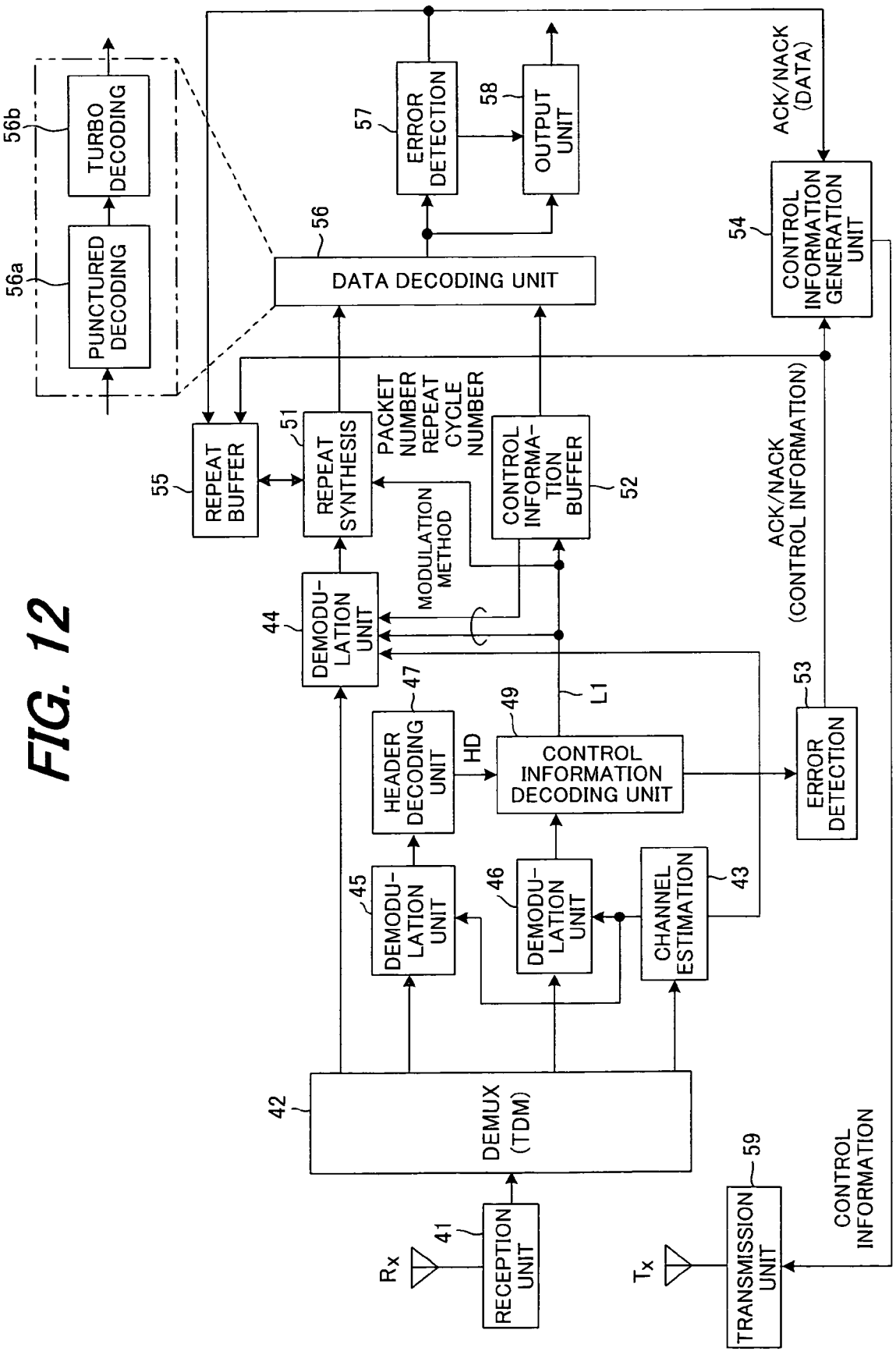
FIG. 12 is a receiver of the fourth embodiment.

FIG. 11 and FIG. 12 illustrate the configurations of the transmitter and receiver of the fourth embodiment in which nothing is inserted as the insertion information. Components identical to those of the transmitter and receiver shown in FIG. 3 and FIG. 4 are assigned with identical reference numerals.

The difference between the transmitter (FIG. 11) of the fourth embodiment and the transmitter (FIG. 3) of the first embodiment is in that (1) the additional pilot generation unit 23 is eliminated, and (2) when the frame shown in (B) of FIG. 1 is repeated due to the reception failure of control information, the selector 26 does not select the second control information CNTB and inserts nothing as the insertion information INZ.

The difference between the receiver (FIG. 12) of the fourth embodiment and the receiver (FIG. 4) of the first embodiment is in that: (1) the channel estimation unit 48 and channel estimation value synthesis unit 50 are eliminated, and (2) the control information decoding unit 49 recognizes which frame of the frames shown in (A) and (B) of FIG. 1 was received based on the header HD, recognizes that noting has been inserted as the insertion information when the frame shown in (B) of FIG. 1 was received, and executes the output control of the control information.

In the fourth embodiment, nothing is inserted into the empty space. Therefore, the transmission power can be accordingly reduced and interference with other cells can be decreased. Furthermore, as will be described below, this is especially effective when the control information and data are code multiplexed.

(F) FIFTH EMBODIMENT

In the above-described embodiment, the pilot, data, control information, and header were time-division multiplexed, but the present invention is also applicable to the case where frequency multiplexing or combined time-division and frequency multiplexing is used.

Figure 13:
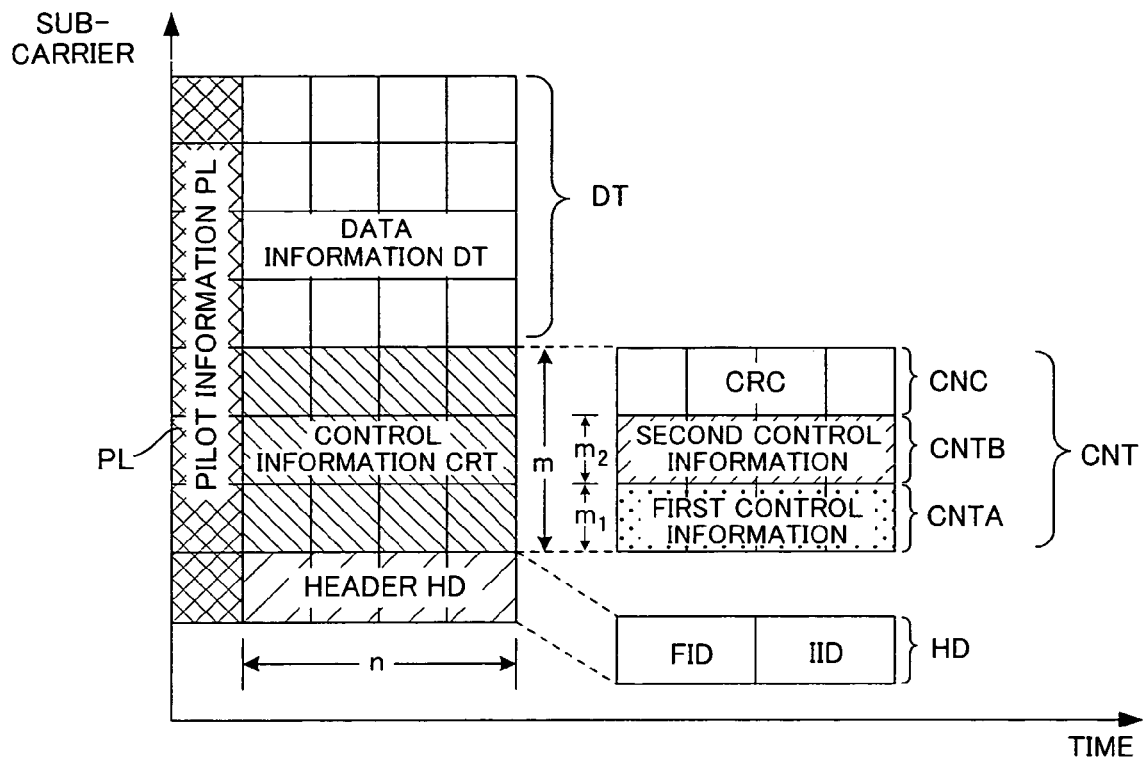
FIG. 13 is an explanatory drawing illustrating the frame format of the fifth embodiment.

FIG. 13 is an explanatory drawing illustrating the frame format of the fifth embodiment in which the pilot PL and other information (data information DT, control information CNT, header HD) are time-division multiplexed, and the data information DT, control information CNT, and header HD are frequency multiplexed in the sub-carrier direction.

If the number of sub-carriers allocated to the control information CNT is denoted by m and time-division multiplexing number is denoted by n, then the control information is specified by m×n bits. Furthermore, if the number of sub-carriers allocated to the first control information CNTA and second control information CNTB is m1 and m2, respectively, then the first control information CNTA is specified by m1×n bits and the second control information CNTB is specified by m2×n bits. Assuming that d and h sub-carriers are similarly allocated to the data DT and header HD, respectively, data information for one frame will be specified by d×n bits and the header HD will be specified by h×n bits.

This frame format can be used when the present invention is employed in a wireless communication system of an OFDM type. Thus, (1) when a new frame is transmitted or when repeat frame is transmitted due to a control information reception failure, the pilot PL, header HD, first and second control information CNTA, CNTB, and data information DT are entirely transmitted in the frame format shown in FIG. 13. Furthermore, (2) when the repeat frame transmitted due to data information reception failure and control information reception is success, the insertion information INI is transmitted instead of the second control information CNTB. The insertion information INI may be part of the pilot, or the first control information CNTA, or data. It is also possible to insert nothing.

Figure 14:
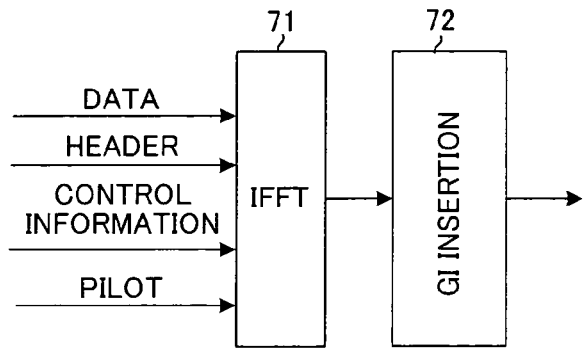
FIG. 14 illustrates the configuration a MUX unit used in the transmitter of an OFDM system.

FIG. 14 is a structural diagram of the MUX unit used in a transmitter of the OFDM type. This unit is composed of a IFFT (inverse fast Fourier transform) unit 71 and a GI insertion unit 72. In the IFFT unit 71, initially, the pilots PL in the number of sub-carriers are inputted in parallel and thereafter data information, header, and control information are inputted simultaneously in parallel in the prescribed time-division numbers. The IFFT unit 71 executes the inverse fast Fourier transform with respect to the parallel data, produces serial data, and outputs them. The GI insertion unit 72 inserts a guard interval (GI) and outputs it. A transmitter of the OFDM type can be obtained by replacing the MUX unit 15 shown in FIG. 3, FIG. 5, FIG. 8, and FIG. 11 with the MUX unit shown in FIG. 14.

Figure 15:
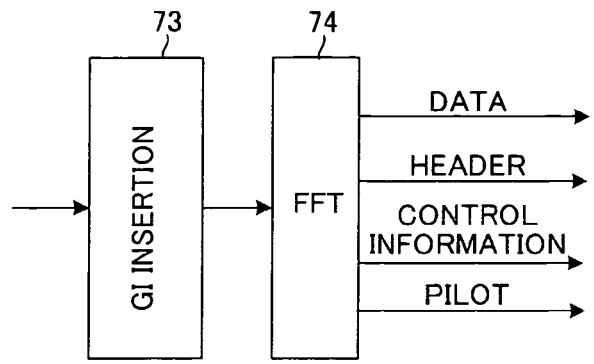
FIG. 15 illustrates the configuration a DEMUX unit used in the receiver of an OFDM system.

FIG. 15 is a structural diagram of the DEMUX unit used in the receiver of the OFDM type, this unit comprising a GI deletion unit 73 and a FFT unit (fast Fourier transform unit) 74. The GI deletion unit 73 deletes the inserted GI. The FFT unit 74 executes the FFT processing in parallel by the number of sub-carriers with respect to the sample data that are inputted in serial, finally outputs parallel data of the pilot and thereafter outputs parallel data of the data information, header and control information. A receiver of the OFDM type can be obtained by replacing the DEMUX unit 42 of the first embodiment shown in FIG. 4 with the DEMUX unit shown in FIG. 15.

According to the fifth embodiment, if part of data is considered to be inserted as the insertion information INI, then a plurality of sub-carriers with different phasing can be used with respect to the same data and a frequency diversity effect can be obtained. When the first control information is inserted the identical effect is obtained.

(G) Sixth Embodiment

In the first to fourth embodiments, the pilot, data, control information, and header were time-division multiplexed, but the present invention is also applicable to the case where code multiplexing is conducted.

Figure 16:
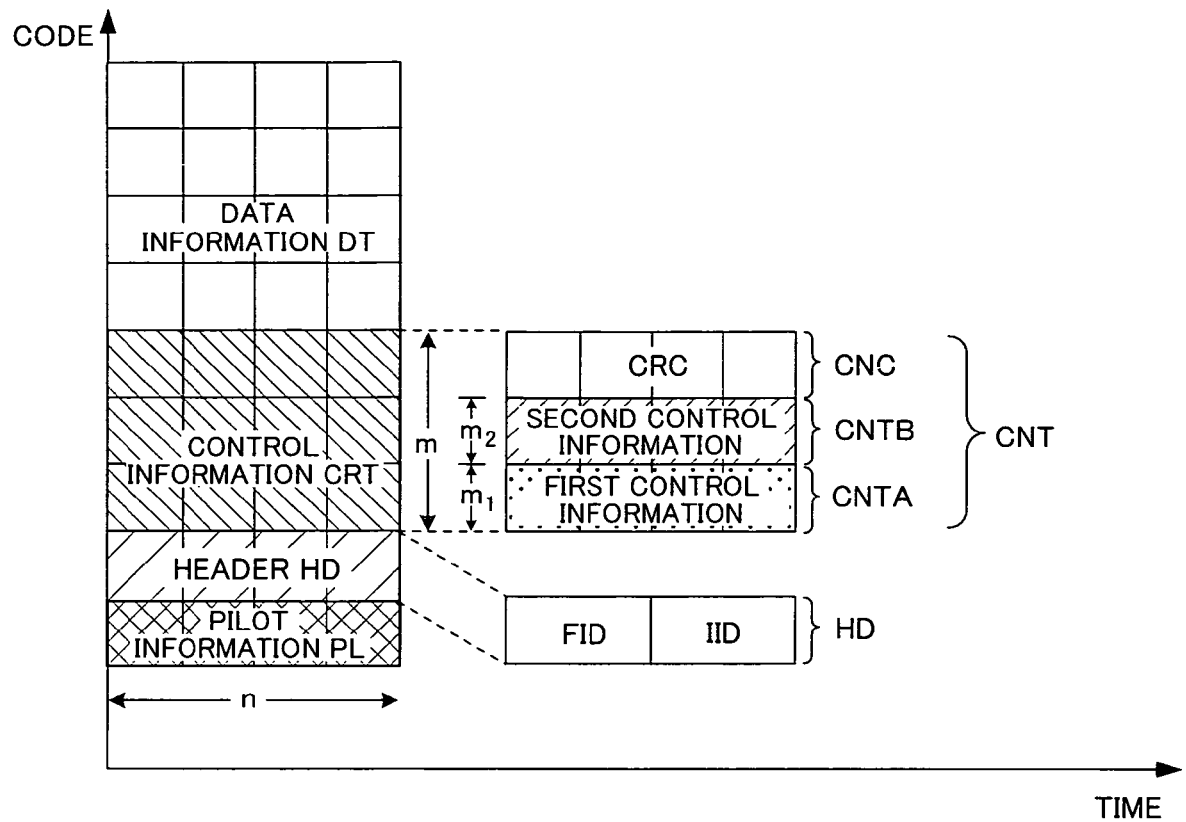
FIG. 16 is an explanatory drawing illustrating the frame format of the sixth embodiment.

FIG. 16 is an explanatory drawing of a frame format of the sixth embodiment. Here, the pilot information PL, data information DT, control information CNT, and header HD are code multiplexed. If the number of codes allocated to the control information CNT is denoted by m and time-division multiplexing number is denoted by n, then the control information is specified by m×n bits. Furthermore, if the number of codes allocated to the first control information CNTA and second control information CNTB is m1 and m2, respectively, then the first control information CNTA is specified by m1×n bits and the second control information CNTB is specified by m2×n bits. The data DT, header HD, and pilot information are similarly specified.

This frame format can be used when the present invention is employed in a CDM wireless communication system. Thus, (1) when a new frame is transmitted or when repeat frame is transmitted due to a control information reception failure, the pilot PL, header HD, first and second control information CNTA, CNTB, and data information DT are entirely transmitted in the frame format shown in FIG. 16. Furthermore, (2) when the repeat frame is transmitted due to data information reception failure (and control information reception success), the insertion information INI is transmitted instead of the second control information CNTB. The insertion information INI may be part of the pilot, or the first control information CNTA, or data. It is also possible to insert nothing.

Figure 17:
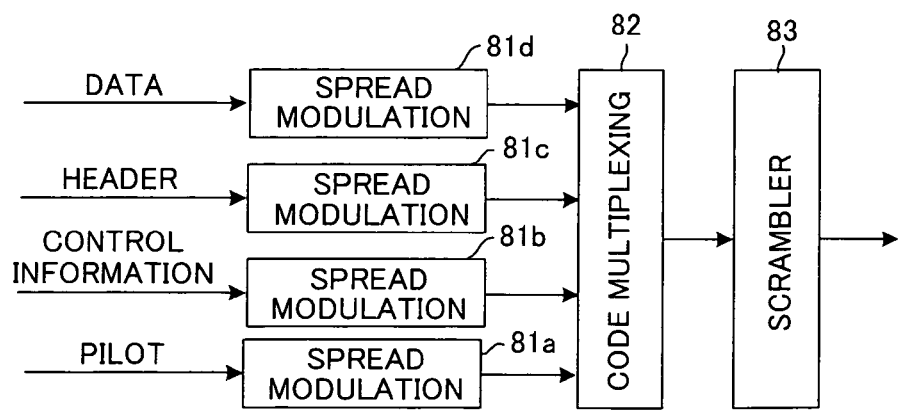
FIG. 17 illustrates the configuration a MUX unit used in the transmitter of an CDM system.

FIG. 17 is a structural diagram of the MUX unit used in a transmitter of the CDM type. This unit comprises spread modulation units 81a-81d for spread modulating pilot information PL, control information CNT, header HD, and data information DT, respectively, a code multiplexing unit 82 for code multiplexing the output of each spread modulation unit, and a scramble unit 83 for scrambling by multiplying the code-multiplexed data by a base station code. A transmitter of the CDM type can be obtained by replacing the MUX unit 15 shown in FIG. 3, FIG. 5, FIG. 8, and FIG. 11 with the MUX unit shown in FIG. 17. And the modulation unit 14 does not perform spreading.

Figure 18:
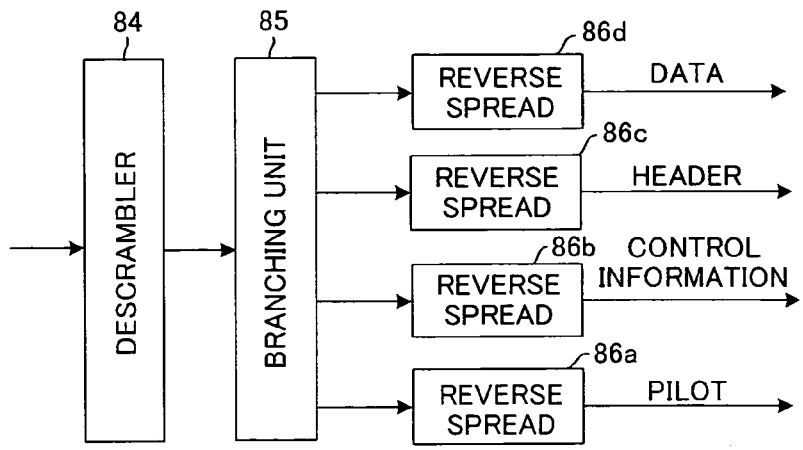
FIG. 18 illustrates the configuration a DEMUX unit used in the receiver of an CDM system.
Figure 19:
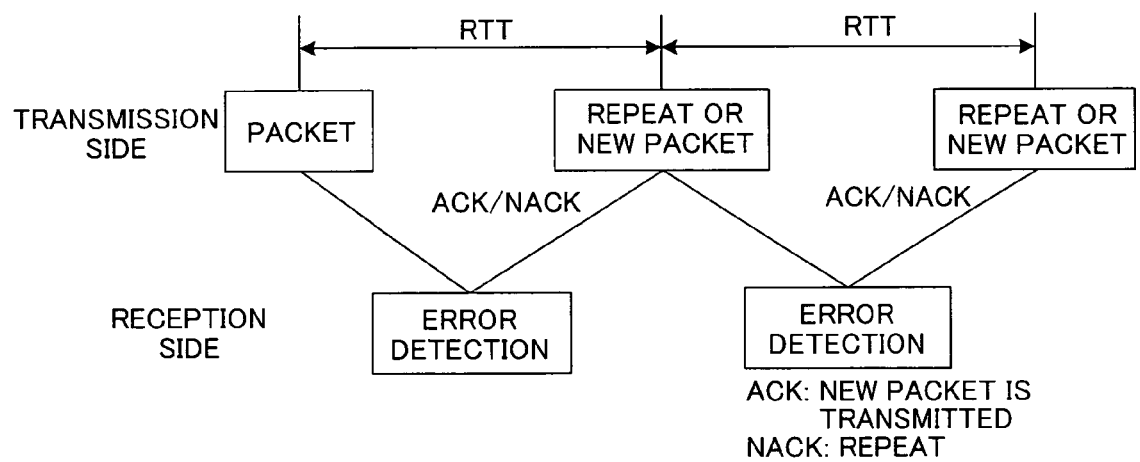
FIG. 19 illustrates the repeat mode based on the ARQ method.
Figure 20:
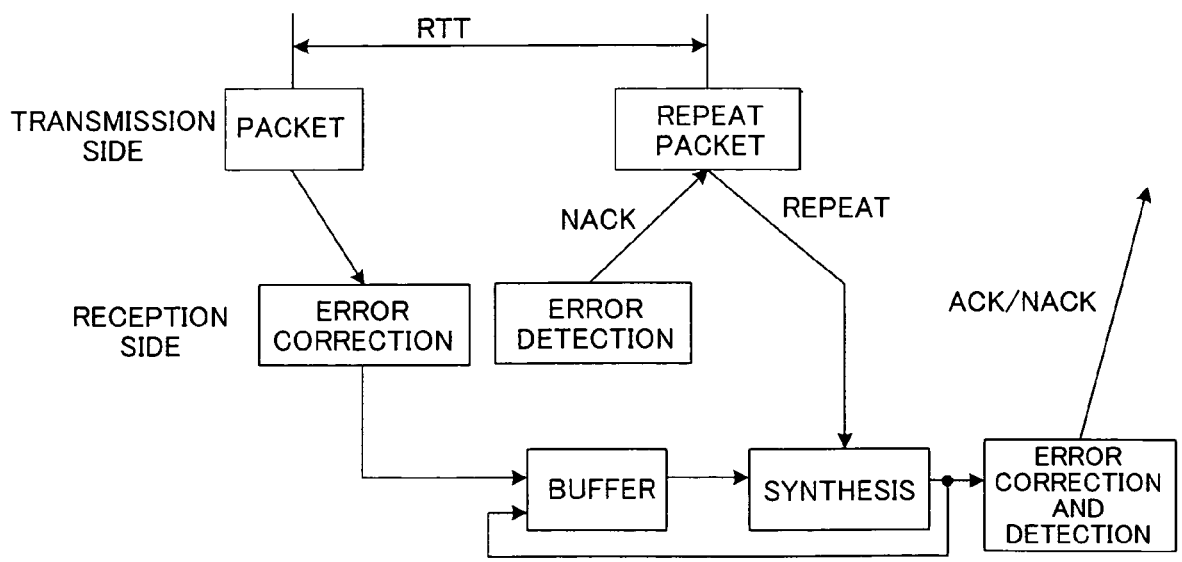
FIG. 20 illustrates the HARQ method using packet synthesis.

FIG. 18 is a structural diagram of the DEMUX unit used in the receiver of the CDM type, this unit comprising a descrambler unit 84 for descrambling by multiplying by a base station code, a branching unit 85 for branching the descrambling results, and a reverse spread units 86a-86d for demodulating the pilot information PL, control information CNT, header HD, and data information DT by multiplying the branched data by the reverse spread code. A receiver of the CDM type can be obtained by replacing the DEMUX unit 42 shown in FIG. 4, FIG. 6, FIG. 9, and FIG. 12 with the DEMUX unit shown in FIG. 18.

According to the sixth embodiment, if nothing is transmitted as the insertion information, then the code multiplexing number during the repeat can be reduced and the signal power can be reduced in the entire frame. Furthermore, if part of data or the control information or pilot is inserted, the multiplexing effect is obtained and the reception accuracy can be increased.

The following effects can be expected by the above-described first to sixth embodiments.

It is not necessary to send the information that is the same during the repeat and new information transmission, and a pilot, or control information, or data can be inserted into an empty space. If the inserted data is the pilot, the increase in channel estimation accuracy can be expected. If the inserted data is control information or data, the error ratio reduction can be expected and, therefore, the throughput can be increased.

When no data is inserted into the empty space during the repeat, the transmission power consumption can be decreased and the interference with outer cells can be reduced. Furthermore, in applications to CDM, inserting no data makes it possible to reduce the code multiplexing number during the repeat and to decrease the signal power.

In application to OFDM, if repetition data are inserted into the empty space during the repeat, then the frequency diversity effect can be expected.

As many apparently widely different embodiments of the present invention can be made without departing from the spirit and scope thereof, it is to be understood that the invention is not limited to the specific embodiments thereof except as defined in the appended claims.

What is claimed is:

1. A retransmission control method in a wireless communication system in which a frame comprising data and control information necessary for reception processing of the data is transmitted from a transmitter and, when a reception failure is notified by a receiver, the frame that failed to be received is retransmitted, the method comprising the steps of:
classifying the control information into first control information that can be different for a new frame transmission and a repeat frame transmission and second control information that is the same for the new frame transmission and the repeat frame transmission;
acquiring information indicating whether or not the receiver has correctly received the control information consisting of the first and second control information and data; and
executing, when the control information has been correctly received, control so that the second control information is not transmitted during the repeat frame transmission.

2. The retransmission control method according to claim 1, further comprising a step of transmitting the first and second control information during the repeat frame transmission if the control information has not been received correctly.

3. The retransmission control method according to claim 1, further comprising a step of additionally providing the frame with an identification information for indentifying whether or not the second control information is contained.

4. The retransmission control method according to claim 1, further comprising a step of inserting a pilot, or the first control information, or the data into an empty space that appears because the second control information is not transmitted, and executing transmission in duplicate thereof.

5. The retransmission control method according to claim 3, comprising the steps of
checking whether each of the control information consisting of the first and second control information and data has been correctly received each time the is received, and conveying the check results to the transmitter;
determining whether the second control information is contained in the frame based on the identification information contained in the frame; when the second control information is contained in the frame, executing the reception control of the data based on the received first and second control information, and storing the second control information; and
executing the reception control of the data based on the received first control information and the second control information that has been stored if the second control information is not contained in the frame.

6. The retransmission control method according to claim 1, further comprising a step of time-division multiplexing, or frequency multiplexing, or code multiplexing, in the data frame, the data, the first and second control information and the pilot.

7. A transmitter for a wireless communication system which transmits a frame comprising data and control information necessary for reception processing of the data and, when a reception failure is notified by a receiver, retransmits the frame that failed to be received, the transmitter comprising:
a control information generation unit for generating first control information that can be different for a new frame transmission and a repeat frame transmission and second control information that is the same for the new frame transmission and the repeat frame transmission;
a control unit for acquiring information indicating whether or not the receiver has correctly received the control information consisting of the first and second control information and data and, when the control information is not transmitted during the repeat frame transmission; and
a transmission unit for transmitting a frame in which the data and the control information consisting of the first and second control information are multiplexed and for transmitting a frame in which the data the first control information are multiplexed.

8. The transmitter according to claim 7, comprising an identification information generation unit for generating identification information for identifying whether or not the second control information is contained, wherein
the transmission unit transmits the identification information with said frame.

9. The transmitter according to claim 7, comprising an insertion unit for inserting a pilot, or the first control information, or the data into an empty space that appears because the second control information is not transmitted.

10. The transmitter according to claim 8, wherein
the transmission unit transmits (1) the data, (2) the first control information or the control information consisting of the first and second control information and (3) pilot by time-division multiplexing, or frequency multiplexing, or code multiplexing.

11. A wireless communication system, which comprises a transmitter and a receiver, and in which a frame comprising data and control information necessary for reception processing of the data is transmitted from the transmitter to the receiver and, when a reception failure is notified by the receiver, the transmitter retransmits the frame that failed to be received, wherein the transmitter comprises:
   a control information generation unit for generating first control information that can be different for a new frame transmission and a repeat frame transmission and second control information that is the same for the frame transmission and the repeat frame transmission;
   a control unit for acquiring information indicating whether or not the receiver has correctly received the control information consisting of the first and second control information and data and, when the control information has been correctly received, executing control so that the second control information is not transmitted during the repeat frame transmission;
   an identification information generation unit for generating identification information for indentifying whether or not the second control information is contained in the frame; and
   a transmission unit for transmitting a frame in which (1) the data, (2) the first control information or the control information consisting of the first and second control information, and (3) the identification information are multiplexed; and the receiver comprises;
   a receiving unit for receiving the frame;
   a normal reception check unit for checking whether the control information consisting of the first and second control information and data have been correctly received for each reception of the frame, and conveying the check results to the transmitter;
   a control information storage unit for storing the second control information contained in the frame; and
   a reception control unit for indentifying whether the second control information is contained in the frame based on the indentification information contained in the frame and, when the second information is contained in the frame, executing reception control of the data based on the received first and second control information, and storing the second control information, and when the second information is not contained in the frame, executing the reception control of the data based on the first control information that has been received and the second control information that has been stored.

12. The wireless communications system according to claim 11, wherein
the transmission unit comprises an insertion unit for inserting a pilot, or the first control information, or the data into an empty space that appears because the second control information is not transmitted.

13. The wireless communication system according to claim 11, wherein
the transmission unit transmits (1) the data, (2) the first control information or the control information consisting of the first and second control information and (3) pilot by time-division multiplexing, of frequency multiplexing, or code multiplexing.

* * * * *